United States Patent
Kanda et al.

(10) Patent No.: US 10,703,162 B2
(45) Date of Patent: Jul. 7, 2020

(54) SUSPENSION CONTROL SYSTEM

(71) Applicant: HONDA MOTOR CO., LTD., Minato-Ku, Tokyo (JP)

(72) Inventors: Ryoma Kanda, Tochigi (JP); Masaki Izawa, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 578 days.

(21) Appl. No.: 14/410,808

(22) PCT Filed: Jun. 20, 2013

(86) PCT No.: PCT/JP2013/003859
§ 371 (c)(1),
(2) Date: Dec. 23, 2014

(87) PCT Pub. No.: WO2014/002444
PCT Pub. Date: Jan. 3, 2014

(65) Prior Publication Data
US 2015/0290995 A1 Oct. 15, 2015

(30) Foreign Application Priority Data

Jun. 29, 2012 (JP) ................................. 2012-147441
Jun. 29, 2012 (JP) ................................. 2012-147446
(Continued)

(51) Int. Cl.
*B60G 17/018* (2006.01)
*B60G 17/016* (2006.01)

(52) U.S. Cl.
CPC ....... *B60G 17/0182* (2013.01); *B60G 17/016* (2013.01); *B60G 17/0161* (2013.01);
(Continued)

(58) Field of Classification Search
CPC ........... B60G 2400/102; B60G 17/018; B60G 17/08; B60G 2400/204; B60G 2500/10;
(Continued)

(56) References Cited

U.S. PATENT DOCUMENTS

| 5,444,621 A | 8/1995 | Matsunaga et al. |
| 5,566,094 A | 10/1996 | Kojima et al. |

(Continued)

FOREIGN PATENT DOCUMENTS

| JP | H05-229328 A | 9/1993 |
| JP | H06-48139 A | 2/1994 |

(Continued)

OTHER PUBLICATIONS

Extended European Search Report dated Jan. 20, 2016 in the corresponding European Patent Application No. 13809729.0.
(Continued)

*Primary Examiner* — Alexander G Kalinowski
*Assistant Examiner* — Sanjeev Malhotra
(74) *Attorney, Agent, or Firm* — Carrier Blackman & Associates, P.C.; Joseph P. Carrier; Jeffrey T. Gedeon

(57) ABSTRACT

A suspension control system allows a state variable of a vehicle used for the damper damping force control to be computed at a high precision without regards to the caster angle given to the suspension geometry. A suspension control system for a vehicle provided with a variable damper that can adjust a damping force according to an input signal comprises a wheel rotational speed sensor for detecting a wheel rotational speed, a gain circuit for computing the unsprung load of each wheel according to the wheel rotational speed variation detected by the wheel speed sensor, a single wheel model computing unit for computing the sprung velocity and the stroke speed by inputting the unsprung load to a single wheel model representing the (Continued)

behavior of the vehicle, and a damper control unit for controlling a damping force of the variable damper according to the computed sprung velocity and stroke speed.

11 Claims, 25 Drawing Sheets

(30) Foreign Application Priority Data

Jun. 29, 2012 (JP) ................................ 2012-147448
Jun. 29, 2012 (JP) ................................ 2012-147454

(52) U.S. Cl.
CPC .. *B60G 2400/202* (2013.01); *B60G 2400/206* (2013.01); *B60G 2400/208* (2013.01); *B60G 2500/106* (2013.01); *B60G 2600/82* (2013.01); *B60G 2800/162* (2013.01); *B60G 2800/70* (2013.01); *B60G 2800/916* (2013.01)

(58) Field of Classification Search
CPC .............. B60G 17/016; B60G 17/0195; B60G 2400/202; B60G 2400/33; B60G 2400/41; B60G 2600/184; B60G 2800/91
USPC ...................................... 701/37, 38; 280/5.5
See application file for complete search history.

(56) References Cited

U.S. PATENT DOCUMENTS

| | | | | |
|---|---|---|---|---|
| 6,208,920 B1* | 3/2001 | Izawa | ................. | B60G 17/016 280/5.5 |
| 7,957,881 B2 | 6/2011 | Itoh | | |
| 8,620,524 B2 | 12/2013 | Kobayashi et al. | | |
| 2002/0103587 A1* | 8/2002 | Kim | ................. | B60G 17/016 701/37 |
| 2002/0103588 A1 | 8/2002 | Kim | | |
| 2004/0039506 A1* | 2/2004 | Kim | ................. | B60G 17/0164 701/37 |
| 2004/0215380 A1* | 10/2004 | Song | ................. | B60G 17/08 701/37 |
| 2006/0136107 A1* | 6/2006 | Kim | ................. | B60G 17/018 701/38 |
| 2008/0228352 A1* | 9/2008 | Brookes | ................. | B60G 17/0155 701/37 |
| 2009/0024277 A1* | 1/2009 | Poilbout | ................. | B60G 3/04 701/38 |
| 2010/0211261 A1* | 8/2010 | Sasaki | ................. | B60G 17/016 701/37 |
| 2013/0166149 A1* | 6/2013 | Liu | ................. | B60G 17/015 701/37 |

FOREIGN PATENT DOCUMENTS

| | | |
|---|---|---|
| JP | H07-117446 A | 5/1995 |
| JP | H07-205788 A | 8/1995 |
| JP | H11-91328 A | 4/1999 |
| JP | 2000-280719 A | 10/2000 |
| JP | 2007-261477 A | 10/2007 |
| JP | 2008-113541 A | 5/2008 |
| JP | 2011-201474 A | 10/2011 |
| JP | 2012-007605 A | 1/2012 |
| WO | 2011151689 A2 | 12/2011 |

OTHER PUBLICATIONS

First Office Action dated Jan. 22, 2016 in the corresponding Chinese Patent Application No. 201380034651.6.

* cited by examiner

SUSPENSION CONTROL SYSTEM

TECHNICAL FIELD

The present invention relates to a vehicle suspension control system provided with a variable damper that can adjust the damping force thereof according to an input signal.

BACKGROUND OF THE INVENTION

In recent years, for use in vehicle suspension systems, various dampers have been developed that can variably control the damping force either in a stepwise fashion or continually. The damping force can be varied not only mechanically by changing the opening area of the orifice provided in the piston by means of a rotary valve but also magnetically by using a magneto-rheological fluid (MRF) for the working fluid, and controlling the viscosity of the fluid by means of a magnetic fluid valve. A vehicle equipped with such a variable damper allows the motion stability and the ride quality of the vehicle to be improved by variably controlling the damping force of the damper according to the operating condition of the vehicle.

As a technology for improving the ride quality, the skyhook control based on the skyhook theory is known. To control the ride quality (vibration) with the skyhook control, the sprung velocity is required to be detected in order to determine the target damping force such that the vertical motion of the sprung mass may be favorably controlled. It is also necessary to detect the stroke speed or the relative velocity between the sprung mass and the unsprung mass in order to perform the skyhook control because the damping force varies in dependence on the stroke speed even when the orifice area and the viscosity of the MRF remain constant.

In a conventional suspension control system performing the skyhook control, each wheel was required to be fitted with a vertical G sensor and/or a stroke sensor for detecting the vertical velocity and the stroke speed of the sprung mass. Such a stroke sensor is required to be placed within the wheelhouse or in an adjacent part of the vehicle body so that there may be some difficulty in finding a space for mounting the stroke sensor. To circumvent such a problem, a suspension control system was developed that computes the relative velocity between the sprung mass and the unsprung mass from variations in the wheel rotational speed and controls the damping force of the damper according the computed relatively velocity and other data without using a stroke sensor. See Patent Document 1.

PRIOR ART DOCUMENT(S)

Patent Document(s)

Patent Document 1: JP06-48139A

SUMMARY OF THE INVENTION

Task to be Accomplished by the Invention

However, according to the suspension system proposed in Patent Document 1, the relative velocity between the sprung mass and the unsprung mass is computed based on the knowledge that as the wheel moves vertically relative to the vehicle body, the wheel moves also in the fore and aft direction owing the caster angle of the wheel given by the geometry of the suspension system, and this causes the wheel rotational speed to change accordingly. Therefore, when the suspension geometry includes no or a very small caster angle, the relative velocity cannot be computed at all or with any acceptable precision.

The present invention was made with the aim of eliminating such a problem of the prior art, and has an object to provide a suspension control system that can compute the state variables of the vehicle used for the damper control at a high precision without regards to the caster angle provided in the suspension geometry.

Means to Accomplish the Task

To achieve such an object, the present invention provides a suspension control system (20) for a vehicle (V) provided with a variable damper (6) that can adjust a damping force according to an input signal ($V_W$), comprising: a wheel rotational speed sensor (9) for detecting a wheel rotational speed ($V_W$); a base input value computing means (37) for computing a base input value ($u_1$) of the vehicle according to a wheel rotational speed variation ($\Delta V_W$) detected by the wheel speed sensor (9); a state variable computing means (31) for computing a state variable ($S_2$, Ss) of the vehicle from a vehicle model (38) representing a behavior of the vehicle and receiving an input of the base input value ($u_1$); and a damper control means (23, 25) for controlling a damping force of the variable damper (6) according to the computed state variable ($S_2$, Ss).

According to this arrangement, the state variables of the vehicle required for the control of the damping force of each damper can be obtained by computing a base input value of a vehicle according to the detected wheel rotational speed variation, and inputting this value to a vehicle model. Therefore, without regards to the caster angle included in the suspension geometry, the state variable of the vehicle can be obtained at a high precision.

According to a certain aspect of the present invention, the base input value includes an unsprung load ($u_1$).

The wheel rotational speed is inversely proportional to the dynamic load radius of the tire, and the dynamic load radius of the tire is substantially proportional to the road contact load of the wheel. Therefore, the wheel rotational speed variation is substantially proportional to the change in the road contact load of the wheel and hence to the unsprung load applied to the unsprung mass. Thus, the claimed structure allows the unsprung load of each wheel to be accurately computed, and the computed unsprung load may be applied to a vehicle model which produces the state variable of the vehicle used for the damping force control of the damper in a highly accurate manner.

According to another aspect of the present invention, the state variable includes a sprung velocity ($S_2$).

Thereby, the sprung velocity in the vertical direction of the vehicle can be computed at a high precision by applying a base input value such as the road surface contact load of the wheel to the vehicle model. Therefore, the conventionally required vertical acceleration sensor can be omitted, and the cost can be reduced.

According to yet another aspect of the present invention, the state variable further includes a suspension stroke speed (Ss).

Thereby, the suspension stroke can be computed at a high precision by applying a base input value such as the road surface contact load of the wheel to the vehicle model. Therefore, the conventionally required stroke sensor can be omitted, and the cost can be reduced. Moreover, the stroke sensor was required to be placed in an environmentally harsh condition, and the elimination of the need for the stroke sensor contributes to the improvement in the reliability of the suspension system.

According to yet another aspect of the present invention, the suspension control system further comprises a first filter for the wheel rotational speed sensor for a first frequency region corresponding to a vibration of a sprung mass, and a second filter for the wheel speed sensor for a second frequency range higher than the first frequency range, wherein the damper control means (23) includes a sprung damping control means (90) for controlling the damping force of the variable damper (6) according to the wheel speed variation ($\Delta V_W$) filtered by the first filter (36), and an unsprung damping control means (95) for controlling the damping force of the variable damper (6) according to the wheel speed variation ($\Delta V_W$) filtered by the second filter (101).

According to this arrangement, two signals of different frequency ranges can be obtained from the detection value of the same wheel rotational speed sensor via two different filters so that the same detection signal can be used for two different control purposes, and this contributes to the improvement in the ride quality of the vehicle.

According to yet another aspect of the present invention, the suspension control system further comprises a vehicle body speed estimating means (32) for estimating a vehicle body speed (Vb) according to a vehicle body acceleration (Gx) of the vehicle, and a wheel rotational speed correcting means (35) for computing a corrected wheel rotational speed by subtracting an estimated wheel rotational speed (Vbi, Vbo) estimated from the vehicle body speed from a detected value of the wheel rotational speed sensor (9), wherein the base input value computing means (37) is configured to compute the base input value ($u_1$) of the vehicle according to a wheel speed variation ($\Delta V_W$) of the corrected wheel rotational speed.

According to this arrangement, because the wheel rotational speed is corrected by subtracting the estimated wheel rotational speed based on the vehicle body speed from the detected value of the wheel rotational speed sensor when computing the base input value of the vehicle, even when the vehicle is accelerating or decelerating, the components of the wheel rotational speed variation due to the acceleration or deceleration can be eliminated, and the state variable of the vehicle can be computed at a high precision.

According to yet another aspect of the present invention, the vehicle body speed estimating means (32) estimates the vehicle body acceleration (Gx) of the vehicle according to a drive/brake force (Fe, Fb) of the vehicle and an inclination of a road surface (or a deceleration Fs due to a road inclination). In other words, the vehicle body speed estimating means (32) may comprise a road surface inclination decelerating force computing unit (56) for computing a decelerating force (Fs) of the vehicle (V) owing to the road surface inclination, an accelerating force computing unit (55) for computing the accelerating force other that due to the road surface inclination, a decelerating force computing unit (57) for computing the decelerating force (Fd) of the vehicle (V) owing to causes other than the road surface inclination, and a vehicle body speed computing unit (52) for computing the vehicle body speed (Vb) from the acceleration/deceleration of the vehicle.

According to this arrangement, because the vehicle body acceleration can be estimated at a high precision, and the vehicle body speed variation component can be accurately removed from the detection value of the wheel rotational speed sensor, the base input value of the vehicle and the associated state variable of the vehicle can be computed at a high precision.

According to yet another aspect of the present invention, the vehicle body speed estimating means (32) estimates a traveling resistance (Fr) of the vehicle according to the detected wheel rotational speed (Vwav), and estimates the vehicle body acceleration (Gx) of the vehicle by taking into account the estimated traveling resistance (Fr). In other words, the vehicle body speed estimating means (32) may further comprise a running resistance computing unit (59) for computing the running resistance so that the vehicle body speed computing unit 52 may compute the vehicle speed (Vb) according to the running resistance (Fr) of the vehicle.

Thereby, by taking into account the running resistance of the vehicle as well as the drive/brake force of the vehicle and the road surface inclination, the vehicle body acceleration can be estimated at a high precision, and the vehicle body speed variation component can be accurately removed from the detection value of the wheel rotational speed sensor so that the base input value of the vehicle and the associated state variable of the vehicle can be computed at a high precision.

According to yet another aspect of the present invention, the suspension control system further comprises a filter (36) for a frequency range corresponding to a vibration of the sprung mass, the filter (36) filtering the detected value of the wheel rotational speed sensor (9) so as to remove variation in the vehicle body acceleration (Gx) in the frequency range corresponding to a vibration of the sprung mass.

According to this arrangement, in addition to the correction based on the estimated wheel rotational speed, the detection value of the wheel rotational speed sensor is passed through the filter for a frequency range corresponding to a vibration of the sprung mass so that the variation component of the vehicle body speed can be effectively eliminated, and the state variable of the vehicle can be computed at a high precision.

According to yet another aspect of the present invention, the suspension control system further comprises a cornering state variable computing means (53) for computing a cornering state variable (Rvi, Rvo) and a wheel rotational speed correcting means (35) for correcting a detected value of the wheel rotational speed sensor (9) according to the computed cornering state variable (Rvi, Rvo), wherein the base input value computing means (37) computes the base input value ($u_1$) of the vehicle according to the wheel speed variation ($\Delta V_W$) of the corrected wheel rotational speed.

According to this arrangement, because the detected value of the wheel rotational speed sensor is corrected by the cornering state variable when computing the base input value of the vehicle, even when the vehicle is cornering, the variation component of the wheel rotational speed owing to the cornering maneuver can be eliminated, and the state variable of the vehicle can be computed at a high precision.

According to yet another aspect of the present invention, the suspension control system further comprises a wheel speed variation extracting means (36) for extracting a wheel speed variation ($\Delta V_W$) of a frequency range corresponding to a sprung vibration of the vehicle according to the detected wheel rotational speed, a sprung velocity computing means (33, 45) for computing the sprung velocity ($S_2$) by using a vehicle model (8) according to the wheel speed variation ($\Delta V_W$) extracted by the wheel speed variation extracting means (36), a stroke speed computing means (33, 46) for computing a suspension stroke speed (Ss) by using a vehicle model (8) according to the wheel speed variation ($\Delta V_W$) extracted by the wheel speed variation extracting means (36), and a skyhook control means (90, 25) for controlling the damping force of the variable damper (6) according to the computed sprung velocity ($S_2$) and the computed stroke speed (Ss).

The wheel rotational speed is inversely proportional to the dynamic load radius of the tire, and the dynamic load radius of the tire is substantially proportional to the road contact load of the wheel. Therefore, the wheel rotational speed variation is substantially linear or proportional to the change in the road contact load of the wheel and hence to the unsprung load applied to the unsprung mass. Therefore, by thus computing the sprung velocity and the stroke speed according to the wheel rotational speed variation extracted by the wheel speed variation extracting means, the damping force of the variable damper can be controlled by the skyhook control based on this computed data. Therefore, the need for the stroke sensor and the vertical G sensor for the sprung mass can be eliminated, and the suspension control system is enabled to perform the skyhook control at a low cost.

According to yet another aspect of the present invention, the wheel rotational speed sensor (9) is provided on a front wheel ($3_F$), and the base input value computing means (37) computes the base input value ($u_{1F}$) with respect to the front wheel ($3_F$), the state variable computing means (31) including a front wheel state variable computing means (231) for computing a state variable ($S_2$, Ss) of the vehicle associated with the front wheel ($3_F$), and a rear wheel state variable computing means (232) for computing a state variable ($S_2$, Ss) of the vehicle associated with a rear wheel ($3_R$) according to the state variable computed by the front wheel state variable computing means (231).

According to this arrangement, the state variable of the vehicle associated with each rear wheel can be computed from the detection value of the wheel rotational speed sensor of the corresponding front wheel. Therefore, the wheel rotational speed sensor for the rear wheel can be omitted. If the rear wheel is connected to the vehicle body via a trailing arm, the accuracy of the computation of the state variable could be impaired because the rear wheel moves in the fore and aft direction as the rear wheel moves vertically. On the other hand, according to the claimed structure, because the state variable of the rear wheel is obtained from the wheel rotational speed variation of the front wheel, the use of the trailing arm does not reduce the accuracy of the computation, and the state variable of the rear wheel can be obtained at a high precision.

According to yet another aspect of the present invention, the base input value computing means (37) computes a base input value including an unsprung load ($u_{1F}$) associated with the front wheel ($3_F$), and the front wheel state variable computing means (231) computes a state variable including an unsprung position ($x_1$) associated with the front wheel ($3_F$), the rear wheel state variable computing means (232) being configured to compute a road surface vertical position ($x_{0F}$) associated with the front wheel ($3_F$) according to the unsprung load ($u_{1F}$) associated with the front wheel ($3_F$) and the unsprung position ($x_{1F}$) associated with the front wheel ($3_F$), and compute the state variable ($S_2$, Ss) of the vehicle associated with a rear wheel ($3_R$) according to the computed road surface vertical position ($x_{0F}$) associated with the front wheel ($3_F$).

According to this arrangement, because the road surface condition can be determined from the vertical position of the front wheel road surface computed from the wheel rotational speed variation of the front wheel, and the state variable of the rear wheel is computed based on the road surface condition, the state variable of the rear wheel can be obtained at a high precision.

According to yet another aspect of the present invention, the rear wheel state variable computing means (232) is configured to compute a road surface vertical position ($x_{0R}$) associated with the rear wheel ($3_R$) by applying a time delay corresponding to a vehicle speed to the road surface vertical position ($x_{0F}$) associated with the front wheel ($3_F$), and compute the state variable ($S_2$, Ss) of the vehicle associated with the rear wheel ($3_R$) according to the road surface vertical position ($x_{0R}$) of the vehicle associated with the rear wheel ($3_R$).

According to this arrangement, the vertical position of the rear wheel road surface is computed by applying a time delay depending on the vehicle speed to the vertical position of the front wheel road surface, and this allows the vertical position of the rear wheel road surface to be computed at a high precision.

According to yet another aspect of the present invention, the rear wheel state variable computing means (232) is configured to compute state variables including the sprung velocity ($S_2$) and the suspension stroke speed (Ss) associated with the rear wheel ($3_R$).

According to this arrangement, the sprung velocity of the rear wheel and the associated stroke speed can be computed from the base input value of the front wheel at a high precision. Therefore, the conventionally required vertical G sensor and the stroke sensor can be eliminated so that the cost can be reduced, and the reliability of the suspension system can be improved.

Effect of the Invention

Thus, the present invention provides a suspension control system that allows a state variable of a vehicle used for the damper damping force control to be computed at a high precision without regards to the caster angle given to the suspension geometry.

EMBODIMENT(S) OF THE PRESENT INVENTION

Embodiments of the suspension control system 20 according to the present invention as applied to a four-wheel motor vehicle are described in the following with reference to the appended drawings. In the appended drawings, the four wheels and the associated elements such as the dampers 6 and the wheel rotational speeds $V_W$ are indicated by numerals or letters followed by a suffix to indicate which of the wheels they correspond to, such as the wheel $3_{FL}$ (front left), wheel $3_{FR}$ (front right), $3_{RL}$ (rear left) and wheel $3_{RR}$ (rear right). These suffixed numerals or letters may also be used to indicate the corresponding components collectively by substituting the suffices in an appropriate manner, such as front wheels $3_F$ and rear wheels $3_R$.

First Embodiment

Overall Structure of the Vehicle V

Figure 1:
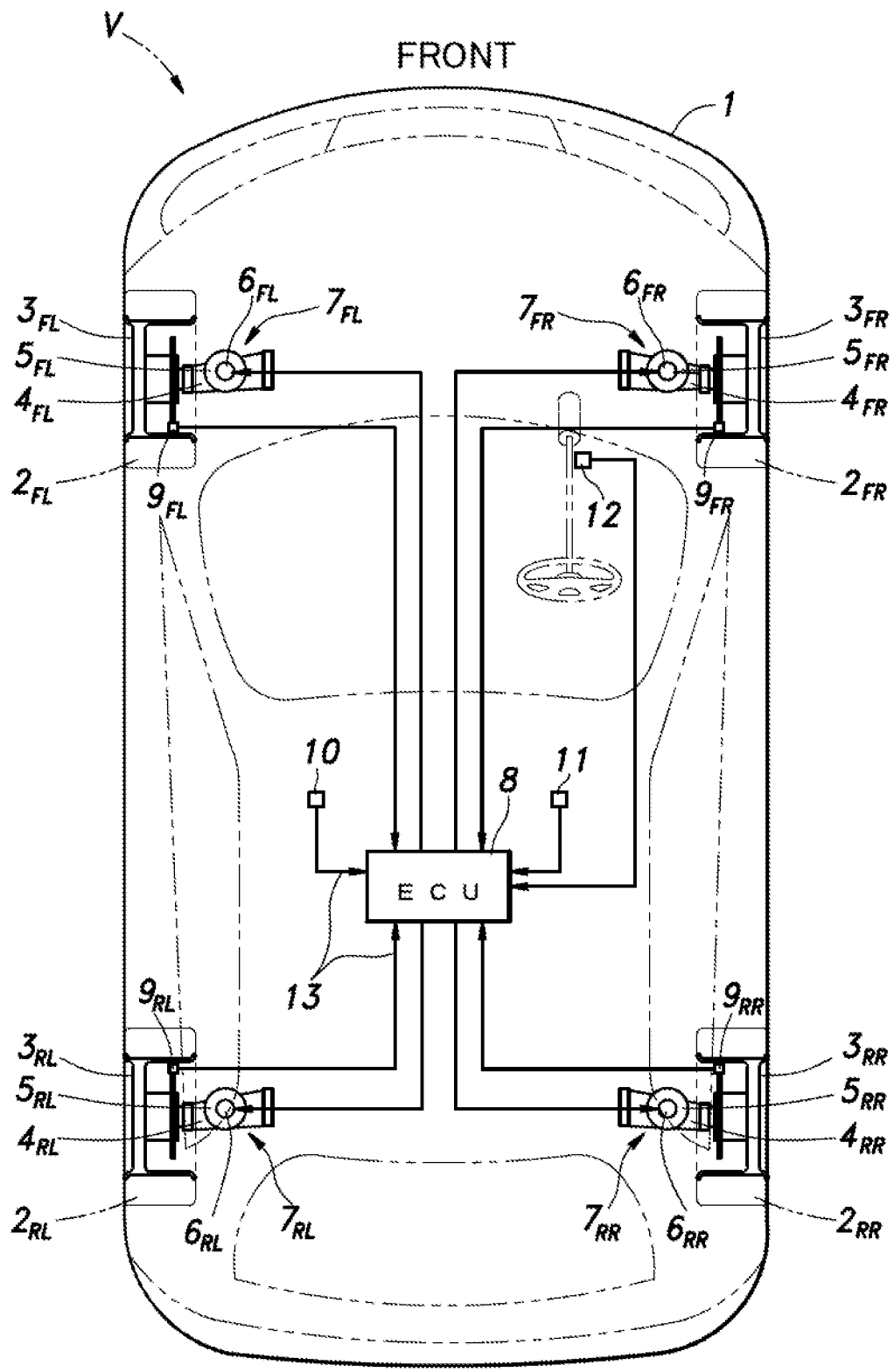
FIG. 1 is a diagram showing the overall structure of a vehicle incorporated with a suspension control system given as a first embodiment of the present invention.

Referring to FIG. 1, the overall structure of the vehicle V of the first embodiment is described in the following. The vehicle body 1 of the vehicle V is provided with wheels 3 on four corner parts thereof, each wheel 3 being fitted with a tire 2 and supported by the vehicle body 1 via a suspension system 7 consisting of a suspension arm 4, a spring 5, a variable damper (which will be simply referred to as a damper 6 in the following description), and so on. The vehicle V is additionally provided with a wheel rotational speed sensor 9 provided in association with each wheel 3 for detecting the wheel rotational speed $V_W$ of the corresponding wheel 3, an ECU (electronic control unit) 8 for controlling the various parts of the vehicle V and various sensors arranged in appropriate parts of the vehicle body, such as a lateral G sensor 10 for detecting the lateral acceleration Gy of the vehicle body, a yaw rate sensor 11 for detecting the yaw rate γ of the vehicle body 1 and a steering angle sensor 12 for detecting the steering angle $δ_f$.

Although not shown in the drawings, the vehicle V may be provided with an ABS (antilock brake system) for preventing the locking of the wheels at the time of braking, a TCS (traction control system) for preventing the slipping of the wheels at the time of acceleration, and a vehicle stability control system (such as a VSA system) for a yaw moment control and a brake assist control during a cornering. The ABS, TCS and VSA are configured to determine the slipping of the wheel by detecting the deviations of the detected value of the wheel rotational speed sensor from the computed wheel rotational speed based on the estimated vehicle body speed Vb, and stabilize the behavior of the vehicle by optimally controlling the braking force and the traction of the vehicle according to the particular traveling condition of the vehicle.

Furthermore, a brake pressure sensor for detecting the brake fluid pressure Pb of the brake device, a torque sensor for detecting the drive torque Te and a gear position sensor for detecting the gear position Pg of the transmission system are arranged in suitable parts of the vehicle V.

The ECU 8 comprises a microcomputer, ROM, RAM, a peripheral circuit, an input/output interface and various drivers, and is connected to the dampers of the wheels 3 and the various sensors 9 to 12 via a communication line which in this embodiment consists of a CAN (controller area network) 13. The ECU 8 and these sensors 9 to 12 jointly form the suspension control system 20.

The dampers 6 of the illustrated embodiment consist of a mono-tube type (de Carbon type) damper which includes a cylinder filled with MRF, a piston rod having a piston fixed at a free end thereof slidably received in the cylinder and separating the cylinder into an upper oil chamber and a lower oil chamber. The piston further includes a communication passage communicating the upper oil chamber and the lower oil chamber with each other, and an MLV coil positioned in this communication passage. This is a per se known structure.

Figure 2:
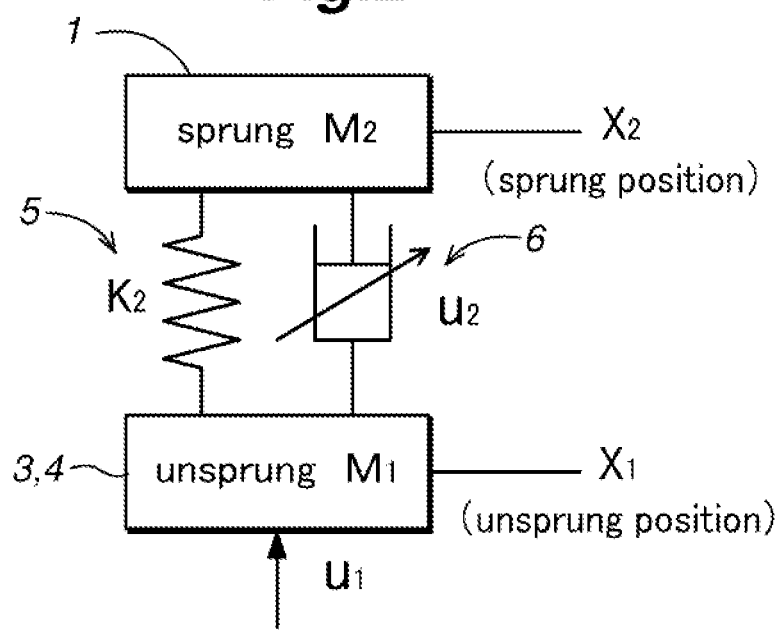
FIG. 2 is a diagram showing a model of the suspension shown in FIG. 1.

The damper 6 of the illustrated embodiment is mounted in the suspension such that the lower end of the cylinder is connected to the upper face of the suspension arm 4 which is on the side of the wheel, and the upper end of the piston rod is connected to a damper base (a wheel house upper) which is on the side of the vehicle body. This is schematically illustrated in FIG. 2. An unsprung mass (moveable parts in the lower part of the suspension including the wheel 3, the knuckle and the suspension arm 4) having a mass $M_1$ is connected to a sprung mass consisting of the vehicle body and having a mass $M_2$ via a spring 5.

When electric current is supplied to the MLV coil, the MRF that flows through the communication passage is subjected to a magnetic field, forming chain-like clusters of ferromagnetic particles. As a result, the apparent viscosity (simply referred to as "viscosity" in the following description) of the MRF that passes through the communication passage increases so that the damping force of the damper 6 increases.

<<ECU 8>>

Figure 3:
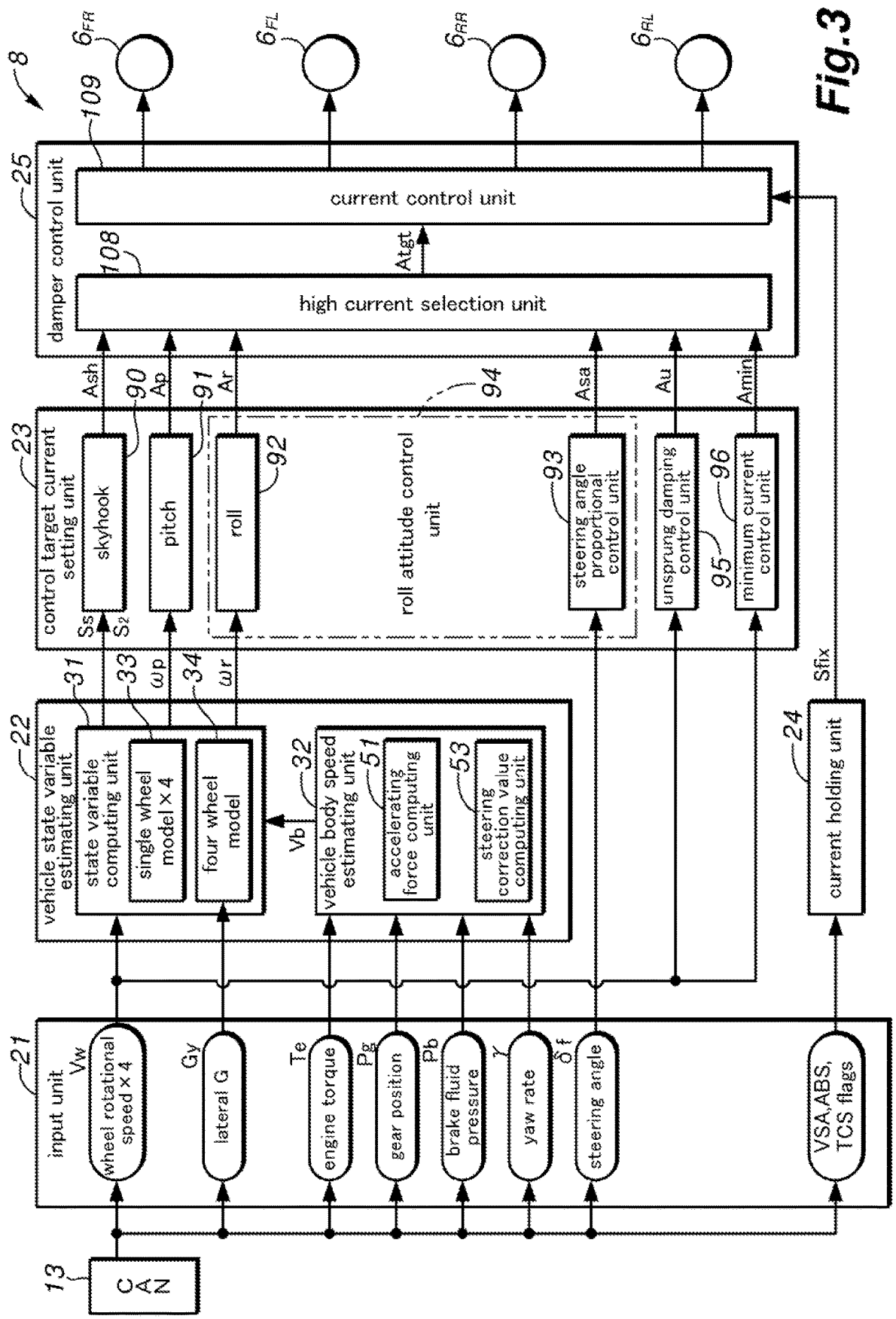
FIG. 3 is a block diagram showing the overall structure of the suspension control system shown in FIG. 1.

Referring to FIG. 3, the structure of the ECU 8 for controlling the damper 6 as a part of the suspension control system 20 is described in the following. The ECU 8 is not only responsible for the control of the damper 6 but also for the control of the ABS, TCS and VSA, but the vehicle behavior control unit that controls the ABS, TCS and VSA is omitted from the following description.

The essential components of the ECU 8 include an input unit 21 connected to the various sensors 9 to 12 and the vehicle behavior control unit, a vehicle state variable estimating unit 22 for estimating the state variables of the vehicle from the detection signals of the sensors 9 to 12, a control target current setting unit 23 for setting a plurality of control target current values for each damper with the aim of improving the motion stability and/or the ride quality, a current holding unit 24 for holding the drive current of each damper 6 by setting a current holding signal Sfix according to a prescribed condition, and a damper control unit 25 for controlling the damping force of each damper by selecting a target current value Atgt from various sorts of control target current values set by the control target current setting unit 23, and generating the drive current for the damper 6 (MLV coil) with the aid of the current holding signal Sfix.

<Vehicle State Variable Estimating Unit 22>

The vehicle state variable estimating unit 22 is configured to estimate the state variables of the vehicle V by making use of the fact that the wheel rotational speed variation $\Delta V_w$ is related to the road contact load variation in a certain way, and includes a state variable computing unit 31 for estimating the various state variables of the vehicle V for each wheel by using a vehicle model, and a vehicle body speed estimating unit 32 for computing the vehicle body speed Vb (inner wheel side vehicle body speed Vbi and outer wheel side vehicle body speed Vbo) which provides a wheel rotational speed correction value for the state variable computing unit 31. The state variable computing unit 31 includes a single wheel model computing unit 33 for each of the wheels, a four wheel model computing unit 34, and a slip determination unit 50 (See FIG. 4). The vehicle body speed estimating unit 32 includes an accelerating/decelerating force computing unit 51 and a steering correction amount computing unit 53 for computing a correction amount due to a steering operation. The various components of the vehicle state variable estimating unit 22 are described in the following with reference to FIGS. 4 to 11.

<State Variable Computing Unit 31>

Figure 4:
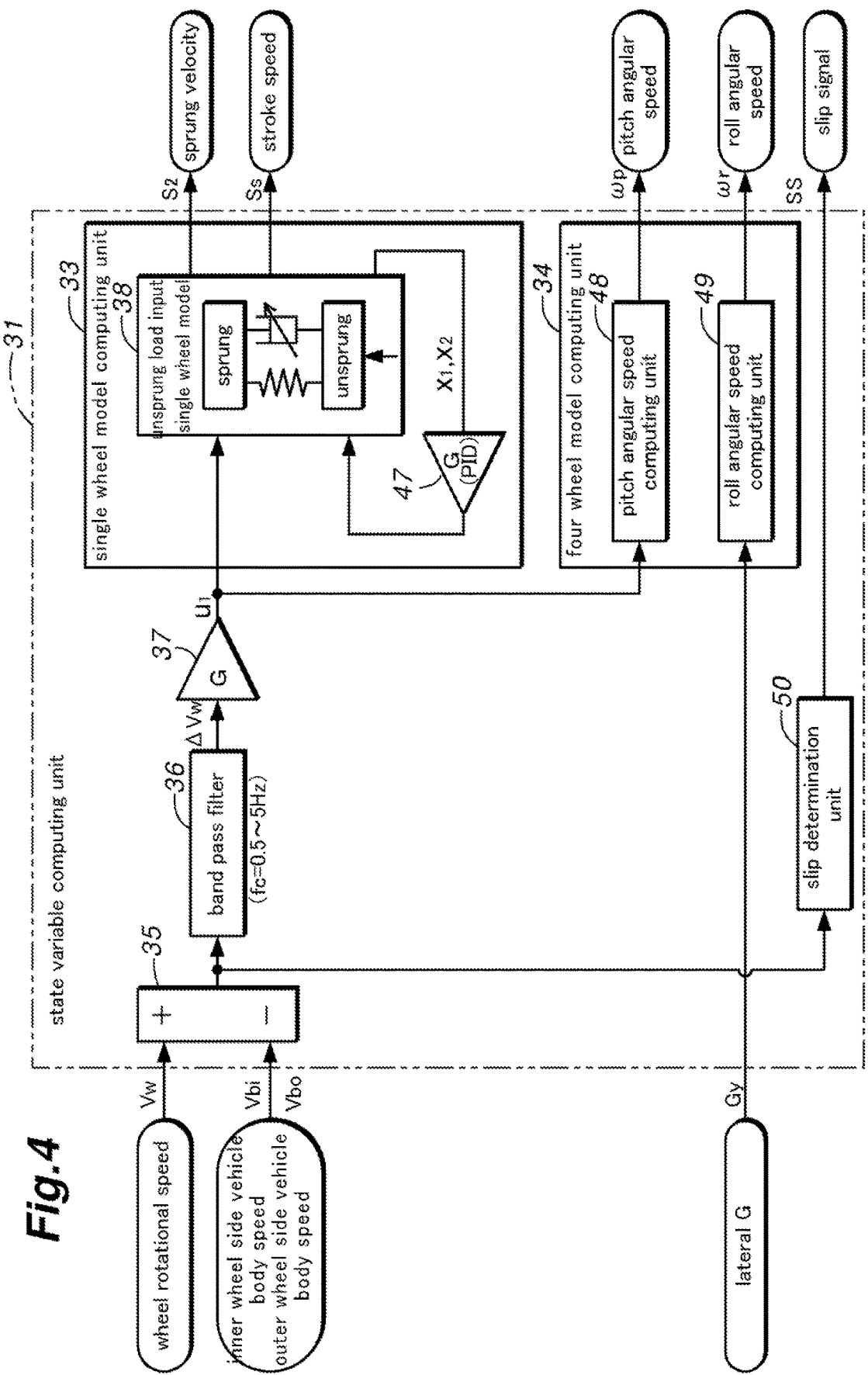
FIG. 4 is a block diagram of the state variable estimating unit shown in FIG. 3.

As shown in FIG. 4, in the state variable computing unit 31, each received wheel rotational speed (signal) Vw is forwarded to a subtractor 35 as a minuend. The subtractor 35 also receives the inner wheel side vehicle body speed Vbi or the outer wheel side vehicle body speed Vbo as a subtrahend so that the wheel rotational speed Vw is corrected by subtracting the inner wheel side vehicle body speed Vbi or the outer wheel side vehicle body speed Vbo from the wheel rotational speed Vw of each wheel. The subtractor 35 thus functions as a wheel rotational speed variation computing means for computing the wheel rotational speed variation $\Delta V_w$ according to the wheel rotational speed Vw.

The inner wheel side vehicle body speed Vbi or the outer wheel side vehicle body speed Vbo forwarded to the subtractor 35 is computed for the purpose of removing the wheel rotational speed variation component owing to the speed variation of the vehicle V and the difference in the trajectory lengths of the inner and outer wheels owing to the difference of the turning radii thereof. In other words, the subtractor 35 serves as a correcting means for removing the vehicle body speed component Vb owing to the driving operation of the vehicle operator from the wheel rotational speed Vw of each wheel by subtracting the inner wheel side vehicle body speed Vbi or the outer wheel side vehicle body speed Vbo computed by the vehicle body speed estimating unit 32 from the wheel rotational speed Vw before being supplied to a band pass filter 36.

The wheel rotational speed Vw processed by the subtractor 35 is forwarded to a gain circuit 37 via the band pass filter 36 which passes the frequency range of 0.5 to 5 Hz. In the illustrated embodiment, because the communication line consists of a CAN 13, and the wheel rotational speed Vw is received at an interval of 10 to 20 msec, the band pass filter 36 is provided with the property to pass the frequency range lower than 5 Hz so that the high frequency components are removed, and the frequency range of the sprung resonance band (signal frequency range corresponding to the sprung vibrations) may be obtained without fail. If the wheel rotational speed Vw is received at shorter intervals, the band pass filter 36 should be provided with a low pass property with a higher cutoff frequency such as 20 Hz so that the frequency range of the unsprung resonance band may be extracted.

The band pass filter 36 is also provided with a high pass property that allows a frequency range higher than 0.5 Hz to be passed so that the DC component may be removed from the wheel rotational speed Vw which is constantly received. Thereby, the vehicle body speed Vb (vehicle body speed component owing to the drive/brake force) caused by the driving operation of the vehicle operator can be removed from the low frequency signal lower than 5 Hz corresponding to the sprung vibrations. In other words, the band pass filter 36 serves as a wheel rotational speed variation extracting means for extracting the wheel rotational speed variation $\Delta V_w$ from the wheel rotational speed Vw. Because the band pass filter 36 allows the DC component to be removed from the wheel rotational speed Vw, it is possible to omit the subtractor 35 for subtracting the vehicle body speed Vb from the wheel rotational speed Vw.

The gain circuit 37 converts the wheel rotational speed variation $\Delta V_w$ into the unsprung load $u_1$ for the corresponding wheel based on a certain relationship that exits between the wheel rotational speed variation $\Delta V_w$ and the unsprung load $u_1$ (road contact load variation). The relationship between the wheel rotational speed variation $\Delta V_w$ and the unsprung load $u_1$ utilized by the gain circuit 37 is described in the following.

Figure 5A:
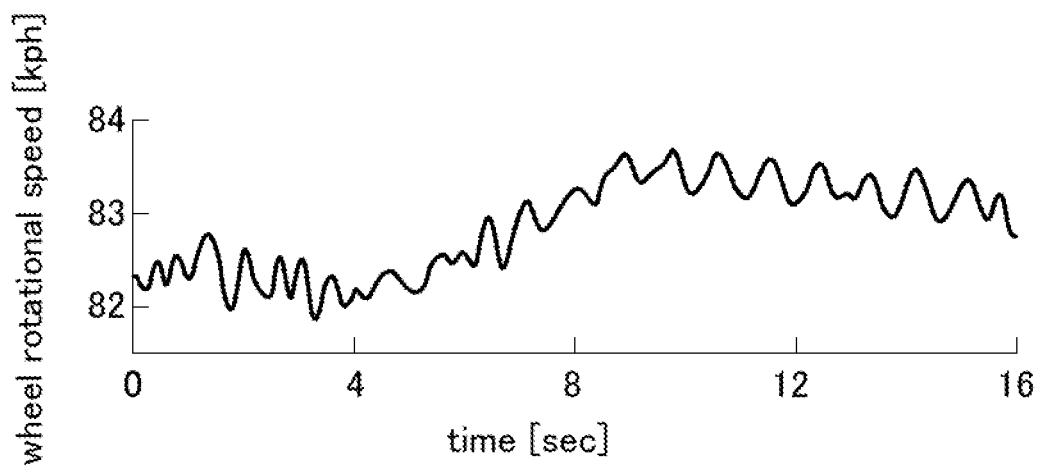
FIG. 5 is a time chart showing the relationship between the wheel rotational speed and the road contract load in the unsprung mass single wheel model shown in FIG. 4.
Figure 5B:
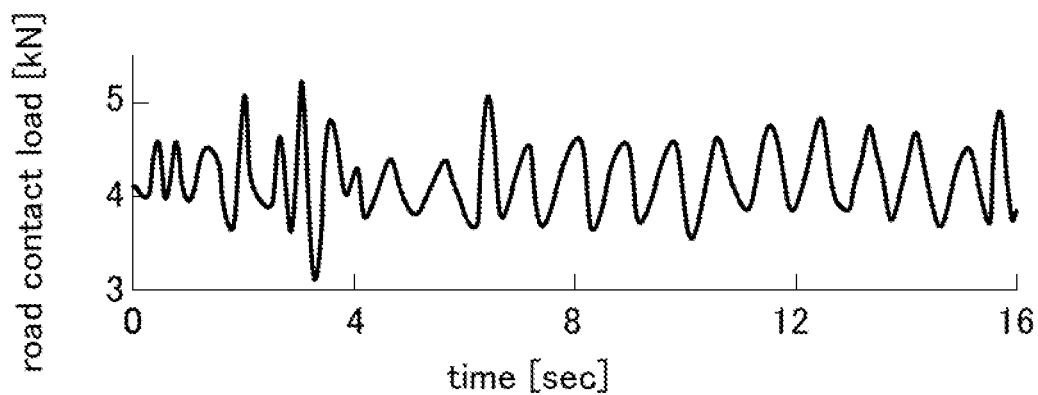

When the vehicle V is traveling straight ahead on a flat road at a constant speed, the road contact load of each wheel 3 is constant, and so is the wheel rotational speed Vw. The contact area of the wheel 3 deforms according to the road contact road (unsprung mass $M_1$+sprung mass $M_2$), and the dynamic radius Rd of each wheel under a loading condition is small than that under no loading condition. When the vehicle is traveling at the speed of 80 km/h, and the road contact load changes as shown in FIG. 5B owing to the irregularities of the road surface, the corresponding change in the dynamic radius Rd of the wheel causes the wheel rotational speed to change as shown in FIG. 5A in correspondence to the road contact load. In this case, the road contact load changes at the frequency of about 1 Hz as the wheel bounces on the road at such a frequency, and this causes the wheel rotational speed Vw to change at about the same frequency. The wheel rotational speed Vw and the road contact load are values actually detected by the corresponding sensors.

Figure 6:
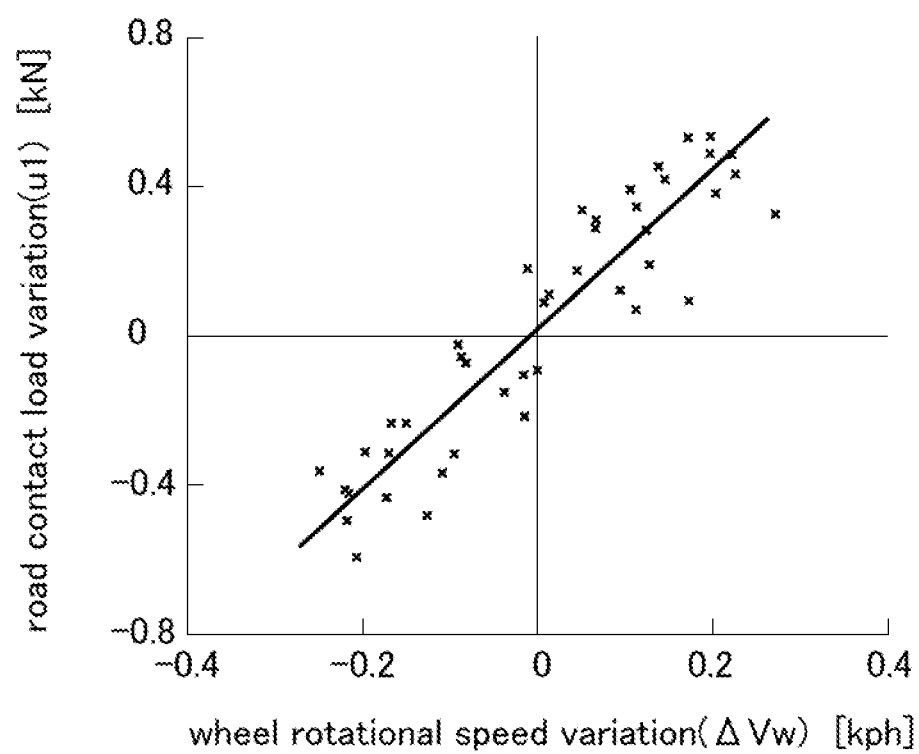
FIG. 6 is a graph showing the relationship between the wheel rotational speed variation and the road contact load variation in the unsprung load single wheel model shown in FIG. 4.

The detection signals from these sensors are processed by the band pass filter (of a pass frequency range of 0.5 to 2 Hz, in this case), and the graph in FIG. 6 shows the relationship between the wheel rotational speed variation ΔVw (ordinate) and the unsprung load $u_1$ (abscissa). As can be seen from FIG. 6, the wheel rotational speed variation ΔVw is substantially proportional to the unsprung load $u_1$ so that it can be represented by the following equation.

$$u_1 = k \cdot \Delta Vw$$

where k is a proportional constant.

Therefore, a gain circuit 37 shown in FIG. 4 computes the unsprung load u1 of each wheel by multiplying the proportional constant k to the wheel rotational speed variation ΔVw. In other words, the gain circuit 37 serves as a base input value computing means that computes the unsprung load $u_1$ (base input value of the vehicle V) from the wheel rotational speed variation ΔVw detected by the wheel rotational speed sensor 9.

By thus performing a correction process consisting of removing the vehicle body speed Vb component from the wheel rotational speed Vw, the wheel rotational speed variation ΔVw can be computed at a high precision without being affected by the variation in the vehicle body speed. By cutting off the frequency range corresponding to the unsprung mass vibrations by using the band pass filter 36, the detection precision of the wheel rotational speed sensor 9, the frequency of the measurement cycle and the communication speed are not required to be unduly high so that the versatility of the suspension control system can be enhanced.

(Single Wheel Model Computing Unit 33)

The unsprung load $u_1$ produced by the gain circuit 37 is forwarded to a single wheel model 38 included in the single wheel model computing unit 33. By inputting the unsprung load $u_1$ to the single wheel model 38, the single wheel model computing unit 33 computes and produces various state variables of the vehicle V such as the sprung velocity S2 and the suspension stroke speed Ss which are used by the skyhook control unit 90. In other words, the single wheel model 38 serves as a state variable computing means that computes various state variables of the vehicle V by using the wheel rotational speed variation ΔVw as an external input.

An example of the single wheel model 38 is described in the following. As discussed above, each wheel 3 of the vehicle V can be represented as shown in FIG. 2. In the following description and the drawings, the first order time derivative (dx/dt) and the second order time derivative ($d^2x/dt^2$) are denoted as given in the following.

$$dx/dt = \dot{x}, \quad d^2x/dt^2 = \ddot{x}$$

$$u = M_1 \ddot{x}_1 + M_2 \ddot{x}_2 \tag{1}$$

where $M_1$ is the mass of the unsprung mass, $M_2$ is the mass of the sprung mass, $x_1$ is the vertical position of the unsprung mass, $x_2$ is the vertical position of the sprung mass, $d^2x_1/dt^2$ is the vertical acceleration of the unsprung mass, and $d^2x_2/dt^2$ is the vertical acceleration of the sprung mass.

The mass of the unsprung mass $M_1$ and the mass of the sprung mass $M_2$ are known. Meanwhile, the input u includes, in addition to the unsprung mass load $u_1$, the damping force $u_2$ of the damper 6 because the damper 6 consists of a variable damper, and the damping force $u_2$ can be computed from the unsprung mass load $u_1$ by using the single wheel model 38. Once the unsprung mass load $u_1$ is computed from the wheel rotational speed Vw, by using the unsprung mass load $u_1$ and the damping force $u_2$ as the input, and performing a computation based on a system matrix that takes into account the spring constant K between the sprung mass and the unsprung mass (the spring constant of the spring 5), the mass of the unsprung mass $M_1$ and the mass of the sprung mass $M_2$, the vertical acceleration of the unsprung mass $d^2x_1/dt^2$, the vertical acceleration of the sprung mass $d^2x_2/dt^2$, the vertical position of the unsprung mass $x_1$, the vertical position of the sprung mass $x_2$. The stroke speed Ss can be represented by $(dx_2/dt - dx_1/dt)$.

More specifically, $M_1 (d^2x_1/dt^2)$, and $M_2 (d^2x_2/dt^2)$ in Equation (1) can be represented by Equations (2) and (3) given in the following.

$$M_1 \ddot{x}_1 = u_1 - K_2(x_1 - x_2) - u_2 \tag{2}$$

$$M_2 \ddot{x}_2 = K_2(x_1 - x_2) + u_2 \tag{3}$$

where $u_1$ is the unsprung load, $u_2$ is the damping force of the damper 6, and K is the spring constant.

In the single wheel model 38, the state equation or Equation (4) given below computes the state variable x given by Equation (5) from the input vector u.

$$\dot{x} = Ax + Bu \tag{4}$$

$$x = [x_1 \, x_2 \, \dot{x}_1 \, \dot{x}_2]^T \tag{5}$$

where x is the state vector, and A and B are system matrices. By using Equations (2) to (5), Equation (4) can be rewritten as given by Equation (6).

$$\dot{x} = \begin{bmatrix} \dot{x}_1 \\ \dot{x}_2 \\ \ddot{x}_1 \\ \ddot{x}_2 \end{bmatrix} = \begin{bmatrix} 0 & 0 & 1 & 0 \\ 0 & 0 & 0 & 1 \\ \frac{-K_2}{M_1} & \frac{K_2}{M_1} & 0 & 0 \\ \frac{K_2}{M_2} & \frac{-K_2}{M_2} & 0 & 0 \end{bmatrix} \begin{bmatrix} x_1 \\ x_2 \\ \dot{x}_1 \\ \dot{x}_2 \end{bmatrix} + \begin{bmatrix} 0 & 0 \\ 0 & 0 \\ \frac{1}{M_1} & \frac{-1}{M_1} \\ 0 & \frac{1}{M_2} \end{bmatrix} \begin{bmatrix} u_1 \\ u_2 \end{bmatrix} \tag{6}$$

Figure 7:
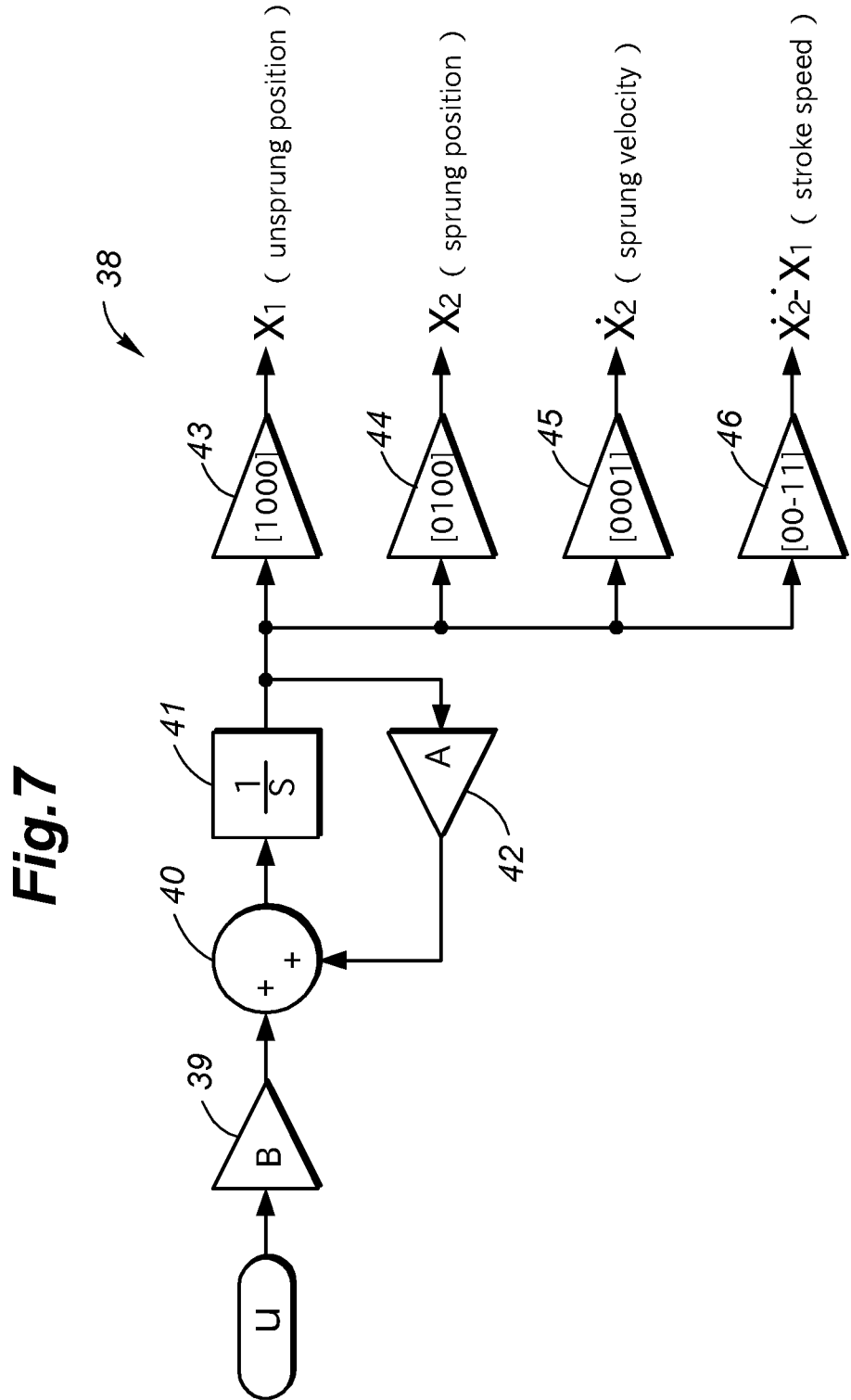
FIG. 7 is a block diagram of the unsprung load single wheel model shown in FIG. 4.

In the single wheel model 38 based on this state equation, as shown in FIG. 7, the input u is forwarded to a computing unit 39 based on the system matrix B, the output of the computing unit 39 is forwarded to an integrator 41 via an adder 40, the output of the integrator 41 is forwarded to a computing unit 42 based on the system matrix A, and the output of the computing unit 42 is returned to the adder 40 as a second input. By obtaining the outputs from a first to a fourth observer matrix 43 to 46 applied to the single wheel model 38, the vertical position of the unsprung mass $x_1$, the vertical position of the sprung mass $x_2$, the sprung velocity S2 ($dx_2/dt$) and the stroke speed Ss ($dx_2/dt - dx_1/dt$) can be obtained. The first observer matrix consists of an unsprung position observer matrix [1, 0, 0, 0], the second observer matrix consists of a sprung position observer matrix [0, 1, 0, 0], the third observer matrix consists of a sprung velocity observer matrix [0, 0, 1, 0], and the fourth observer matrix consists of a stroke speed observer matrix [0, 0, −1, 1]. In other words, the first to the fourth observer matrices 43 to 46 serve as means for computing the vertical position of the unsprung mass $x_1$, the vertical position of the sprung mass $x_2$, the sprung velocity $S_2$ and the stroke speed Ss according to the wheel rotational speed variation ΔVw in the single wheel model 38.

By feeding the unsprung load $u_1$ computed from the wheel rotational speed variation $\Delta Vw$ to the single wheel model 38 in this manner, the sprung velocity $S_2$ and the stroke speed Ss can be computed without regard to the caster angle that may be given to the suspension system. Because the sprung velocity $S_2$ and the stroke speed Ss can be computed from the unsprung load $u_1$, the vehicle V is not required to be provided with a vertical G sensor or a stroke sensor so that the cost of the suspension control system can be minimized.

Referring to FIG. 4 once again, the single wheel model computing unit 33 is provided with a PID circuit 47 for feeding back the vertical position of the unsprung mass $x_1$ and the vertical position of the sprung mass $x_2$ computed from the single wheel model 38. Thereby, the vertical position of the unsprung mass $x_1$ and the vertical position of the sprung mass $x_2$ computed by the single wheel model computing unit 33 are corrected according to the deviations between the unsprung reference position $x_{10}$ (=0) and the position of the unsprung mass $x_1$, and between the sprung reference position $x_{20}$ (=0) and the vertical position of the sprung mass $x_2$ so that the vertical position of the unsprung mass $x_1$ and the vertical position of the sprung mass $x_2$ of the single wheel model 38 are allowed to converge to the reference positions (initial values) during the normal condition such as when the vehicle is traveling straight on a flat road at a constant speed.

Because the unsprung load $u_1$ is adjusted with reference to the reference positions, even when an input with a persistent offset is supplied to the system, it is prevented from causing significant errors in the sprung velocity $S_2$ and the stroke speed Ss. Also, data from other control systems may also be utilized.

Thus, the single wheel model computing unit 33 serves as a position computing means for computing the vertical position of the unsprung mass $x_1$ and the vertical position of the sprung mass $x_2$ for the given input of the unsprung mass load $u_1$ and the damping force $u_2$ by obtaining the outputs of the first observer matrix 43 and the second observer matrix 44 of the single wheel model 38. In the illustrated embodiment, the single wheel model computing unit 33 is configured such that PID circuit 47 feeds back both of the vertical position of the unsprung mass $x_1$ and the vertical position of the sprung mass $x_2$, but may also feed back at least one of the unsprung mass $x_1$ and the vertical position of the sprung mass $x_2$ while the unsprung mass $x_1$ and the vertical position of the sprung mass $x_2$ are appropriately corrected. The sprung velocity $S_2$ and the stroke speed Ss computed by the single wheel model computing unit 33 are forwarded to the skyhook control unit 90 as shown in FIG. 3.

(Four Wheel Model Computing Unit 34)

As shown in FIG. 4, the four wheel model computing unit 34 included in the state variable computing unit 31 is provided with a pitch angular velocity computing unit 48 and a roll angular velocity computing unit 49. The pitch angular velocity computing unit 48 receives the unsprung load $u_1$ produced from the gain circuit 37. The pitch angular velocity computing unit 48 computes the acceleration/deceleration of the vehicle V (fore and aft acceleration Gx) from the unsprung load $u_1$ (according to the wheel rotational speed variation $\Delta Vw$), and obtains a pitch angular speed $\omega_p$ from the computed acceleration/deceleration, the suspension property and the value of the sprung mass $M_2$. The roll angular velocity computing unit 49 computes a roll angular speed $\omega_r$ from the received lateral acceleration Gy, the suspension property and the value of the sprung mass $M_2$. As shown in FIG. 3, the pitch angular speed $\omega_p$ is supplied to a pitch control unit 91, and the roll angular speed co, is supplied to a roll control unit 92.

(Slip Determination Unit 50)

The slip determination unit 50 receives the wheel rotational speed $\Delta Vw$ supplied by the subtractor 35, or the deviation between the actual wheel rotational speed Vw of each wheel and the estimated vehicle body speed Vb. The slip determination unit 50 determines if the absolute value of the received wheel rotational speed variation $\Delta Vw$ (deviation) has exceeded a prescribed value, or if the deviation of the wheel rotational speed Vw detected by the wheel rotational speed sensor 9 from the vehicle body speed Vb has exceeded a prescribed value. If the deviation is greater than the prescribed value, the corresponding wheel 3 can be determined as slipping, and a slip signal SS is produced. The produced slip signal SS is forwarded to a vehicle behavior control unit (not shown in the drawings) that controls the ABS, TCS and VSA. Upon receiving the slip signal SS, the vehicle behavior control unit actuates one or more of the ABS, TCS and VSA, and an activation signal indicating the operation of any of these systems is forwarded to the input unit 21.

<Vehicle Body Speed Estimating Unit 32>

Figure 8:
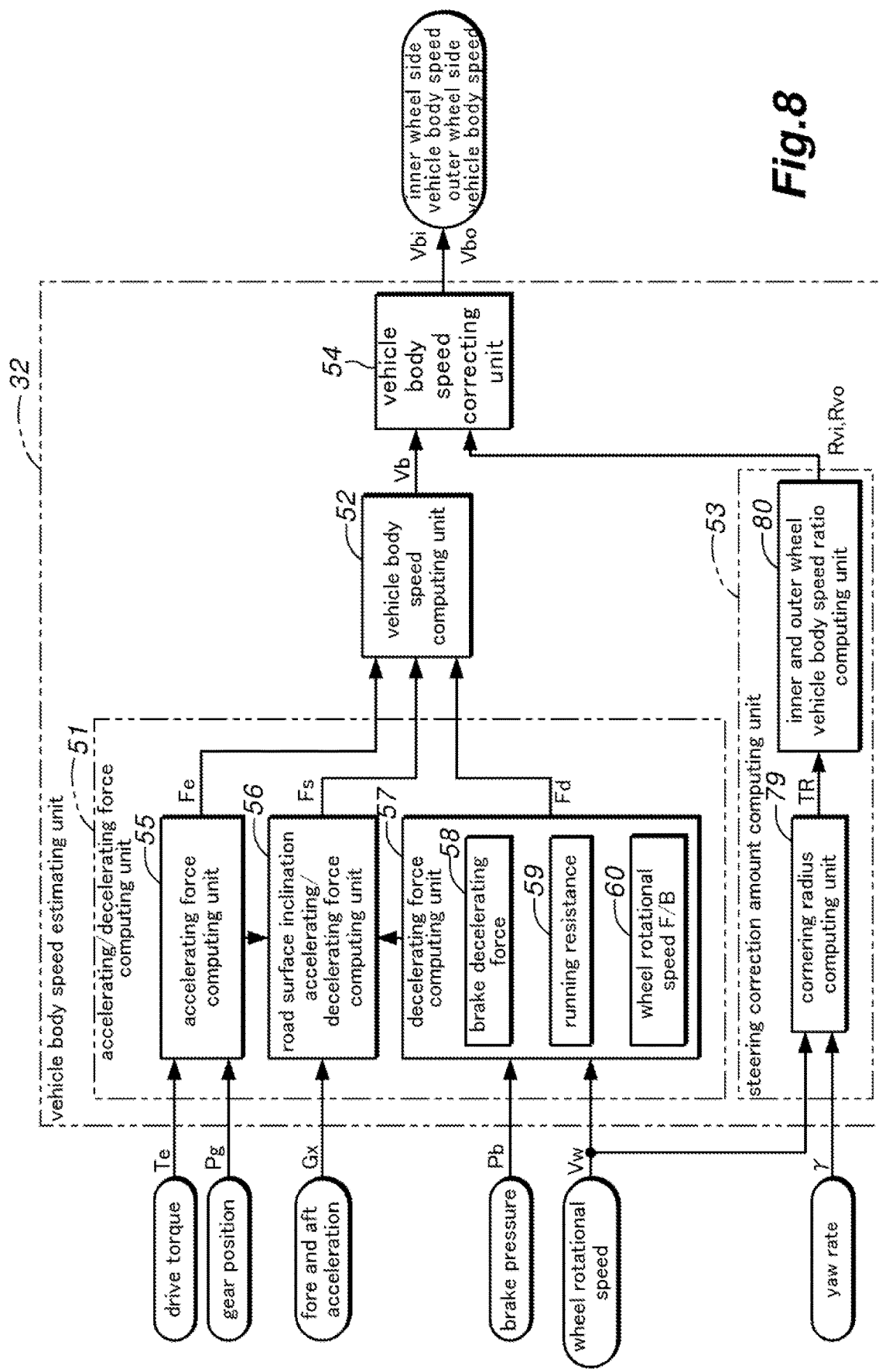
FIG. 8 is a block diagram of the vehicle body speed estimating unit shown in FIG. 3.

The vehicle body speed estimating unit 32 shown in FIG. 3 includes, as shown in FIG. 8, an accelerating/decelerating force computing unit 51 for computing the acceleration/deceleration F (Fe, Fs, Fd) of the vehicle V, a vehicle body speed computing unit 52 for computing the vehicle body speed Vb from the acceleration/deceleration computed by the accelerating/decelerating force computing unit 51, a steering correction amount computing unit 53 for computing a correction amount (inner wheel vs vehicle body speed ratio Rvi and outer wheel vs vehicle body speed ratio Rvo) based on a steering operation, and a vehicle body speed correcting unit 54 for correcting the vehicle body speed Vb according to the correction amount computed by the steering correction amount computing unit 53.

The accelerating/decelerating force computing unit 51 includes an accelerating force computing unit 55 for computing the drive force Fe (accelerating force), a road surface inclination decelerating force computing unit 56 for computing a decelerating force Fs of the vehicle V owing to the road surface inclination, and a decelerating force computing unit 57 for computing the decelerating force Fd of the vehicle V owing to causes other than the road surface inclination.

The accelerating force computing unit 55 computes the drive force Fe of the vehicle V owing to the output of the engine from the drive torque Te detected by the torque sensor and the gear position Pg.

The road surface inclination decelerating force computing unit 56 computes the decelerating force Fs owing to the road inclination by subtracting the accelerating/decelerating force obtained by multiplying the fore and aft acceleration Gxd detected by the fore and aft G sensor by the vehicle body mass M from the accelerating/decelerating force obtained by subtracting the decelerating force Fd computed by the decelerating force computing unit 57 from the drive force Fe computed by the accelerating force computing unit 55.

The decelerating force computing unit 57 includes a brake decelerating force computing unit 58 for computing the decelerating force of the vehicle V which increases in proportion to the brake fluid pressure Pb owing to the brake operation, a running resistance computing unit 59 for computing the running resistance which depends on the vehicle body configuration and the vehicle body speed by using the average value of the wheel rotational speed for obtaining the vehicle body speed, and a feedback resistance computing unit 60 for computing the running resistance owing to the wheel rotational speed feedback. By adding the outputs of the brake decelerating force computing unit 58, the running resistance computing unit 59 and the feedback resistance computing unit 60, the decelerating force Fd of the vehicle V owing to factors other than the road surface inclination can be computed.

The vehicle body speed computing unit 52 computes the accelerating/decelerating force F of the vehicle body 1 by subtracting the decelerating force Fs computed by the road surface inclination decelerating force computing unit 56 and the decelerating force Fd computed by the decelerating force computing unit 57 from the drive force Fe computed by the accelerating force computing unit 55, and obtains the acceleration by dividing the computed accelerating/decelerating force F of the vehicle V by the vehicle body mass. The computed accelerating/decelerating force F is integrated so as to provide the vehicle body speed Vb which is then forwarded to the vehicle body speed correcting unit 54.

Figure 9:
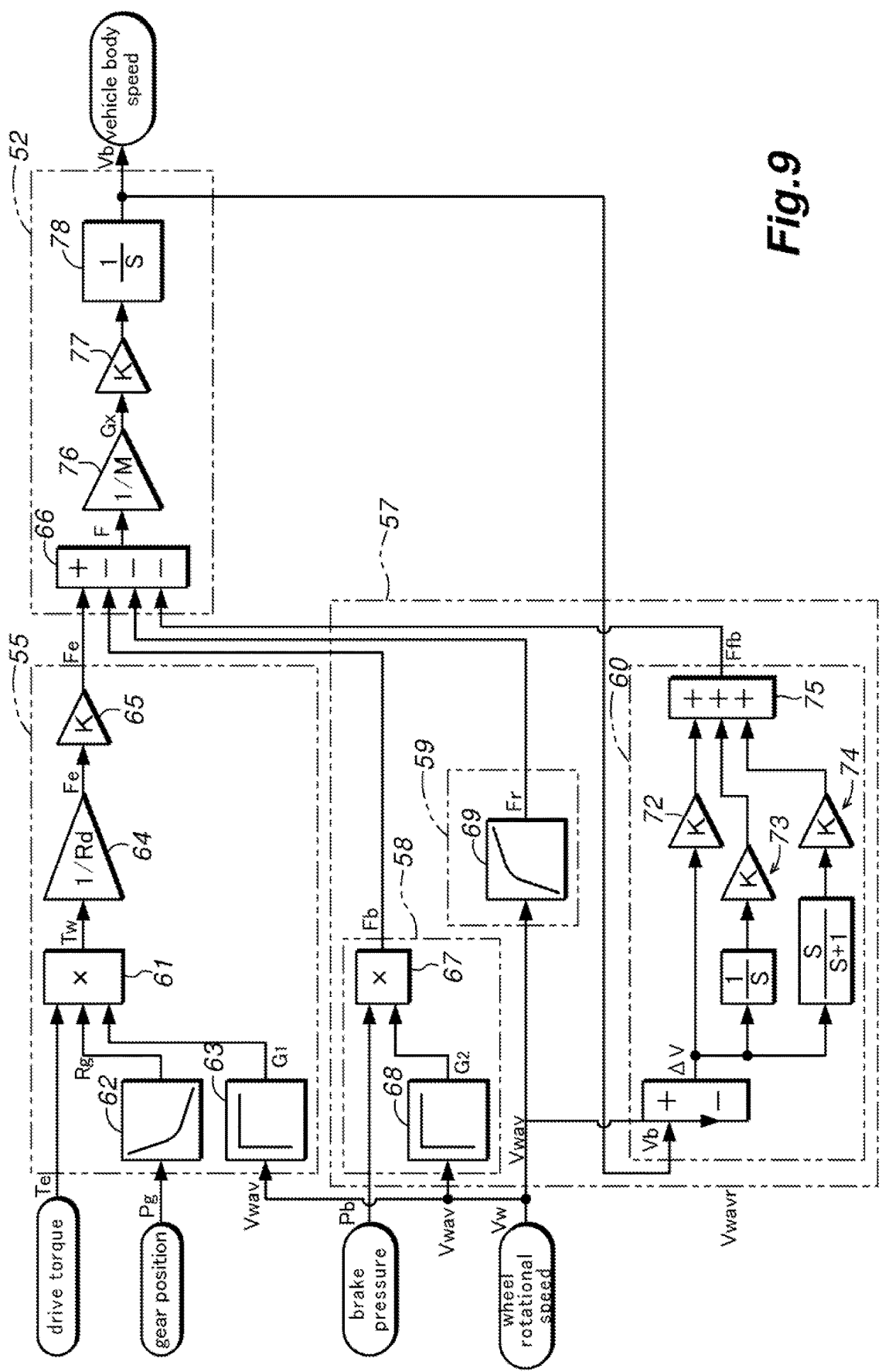
FIG. 9 is a block diagram of an essential part of the vehicle body speed estimating unit shown in FIG. 8.

Referring to FIG. 9, the processes that are executed by the road surface inclination decelerating force computing unit 56 and the decelerating force computing unit 57 are described in the following. The drive torque Te is forwarded to a multiplier 61. The gear position Pg is forwarded to a gear position—gear ratio conversion circuit 62. The gear position—gear ratio conversion circuit 62 produces a transmission gear ratio Rg from the gear position Pg by looking up a table, and forwards the obtained transmission gear ratio Rg to the multiplier 61. The multiplier 61 also receives a first wheel rotational speed gain $G_1$ from a first wheel rotational speed gain setting circuit 63 which will be described hereinafter.

The first wheel rotational speed gain $G_1$ is set up according to an average wheel rotational speed Vwav given as an average value of the rotational speed of the wheel 3 detected by each wheel rotational speed sensor 9 in the first wheel rotational speed gain setting circuit 63. In the illustrated embodiment, the first wheel rotational speed gain $G_1$ is given as zero in the region where the average wheel rotational speed Vwav is extremely small, and as a substantially constant value when the average wheel rotational speed Vwav is greater than a prescribed threshold value. The multiplier 61 multiplies the drive torque Te, the transmission gear ratio Rg and the first wheel rotational speed gain $G_1$ to produce the wheel torque Tw applied to the drive wheel. The wheel torque Tw is forwarded to a torque-drive force conversion circuit 64 to be converted into a drive force Fe of the vehicle V by being divided by the dynamic load radius Rd of the tire 2, and the output from the torque-drive force conversion circuit 64 is forwarded to a subtractor 66 as a minuend value via a gain circuit 65.

The subtractor 66 receives, in addition to the drive force Fe supplied by the gain circuit 65, a brake force Fb, a running resistance Fr and a feedback resistance Ffb which will be described hereinafter.

The brake fluid pressure Pb is forwarded to a multiplier 67 which also receives a second wheel rotational speed gain $G_2$ from a second wheel rotational speed gain setting circuit 68. The second wheel rotational speed gain $G_2$ is set up in the second wheel rotational speed gain setting circuit 68 by looking up a look up table according to the average wheel rotational speed Vwav. In the illustrated embodiment, the second wheel rotational speed gain $G_2$ is zero when the average wheel rotational speed Vwav is extremely small, and is a constant value when the average wheel rotational speed Vwav is grater than a prescribed threshold value. The brake force Fb representing the brake force produced by the brake device is computed in the multiplier 67 by multiplying the brake fluid pressure Pb to the second wheel rotational speed gain $G_2$, and the brake force Fb consisting of a positive value is forwarded to the subtractor 66 as a subtrahend.

The average wheel rotational speed Vwav is forwarded to a running resistance setting circuit 69 which sets a running resistance Fr as a positive value depending on the vehicle speed (average wheel rotational speed Vwav) by looking up a look up table according to the received average wheel rotational speed Vwav. The running resistance Fr obtained by the running resistance setting circuit 69 is forwarded to the subtractor 66 as a subtrahend.

Furthermore, the average rear wheel rotational speed $Vwav_R$ given as an average rotational speed of the rear wheel $3_R$ which is a non-driven wheel is forwarded to the feedback resistance computing unit 60. The feedback resistance computing unit 60 includes a proportional circuit 72 for setting a running resistance according to a proportional gain, an integral circuit 73 for setting a running resistance according to an integral gain and a differential circuit 74 for setting a running resistance according to a differential gain, from the deviation ΔV obtained by subtracting the average rear wheel rotational speed $Vwav_R$ from the vehicle body speed Vb in a subtractor 71 in each case. The outputs of the proportional circuit 72, the integral circuit 73 and the differential circuit 74 are added in an adder 75, and the feedback resistance Ffb which is a correctional value based on the feedback of the vehicle body speed Vb is obtained. The obtained feedback resistance Ffb is forwarded to the subtractor 66 as a subtrahend.

In the subtractor 66, the brake force Fb, the running resistance Fr and the feedback resistance Ffb as well as the deceleration force Fs owing to the road surface inclination are subtracted from the drive force Fe, and the accelerating/decelerating force F thus obtained is forwarded to an accelerating/decelerating force–acceleration/deceleration conversion circuit 76 which produces the acceleration/deceleration (fore and aft acceleration Gx) by dividing the accelerating/decelerating force F by the vehicle mass M. The acceleration/deceleration of the vehicle V is converted into the vehicle body speed by being integrated by an integrator 78.

The vehicle body speed Vb for correcting the wheel rotational speed Vw can be obtained from the brake force Fb, the running resistance Fr, the feedback resistance Ffb and the decelerating force Fs in this manner.

Referring to FIG. 8 once again, the steering correction amount computing unit 53 includes a cornering radius computing unit 79 for computing the cornering radius TR of the vehicle V according to the wheel rotational speeds Vw and the yaw rate γ and an inner and outer wheel vehicle body speed ratio computing unit 80 for computing the cornering state variable serving as a correction value (the inner wheel vehicle body speed ratio Rvi and the outer wheel vehicle body speed ratio Rvo which are given as ratios of the speeds of the part of the vehicle body corresponding to the inner wheel and the outer wheel, respectively, to the vehicle body speed Vb) according to the tread T of the vehicle V and the computed cornering radius TR.

Figure 10:
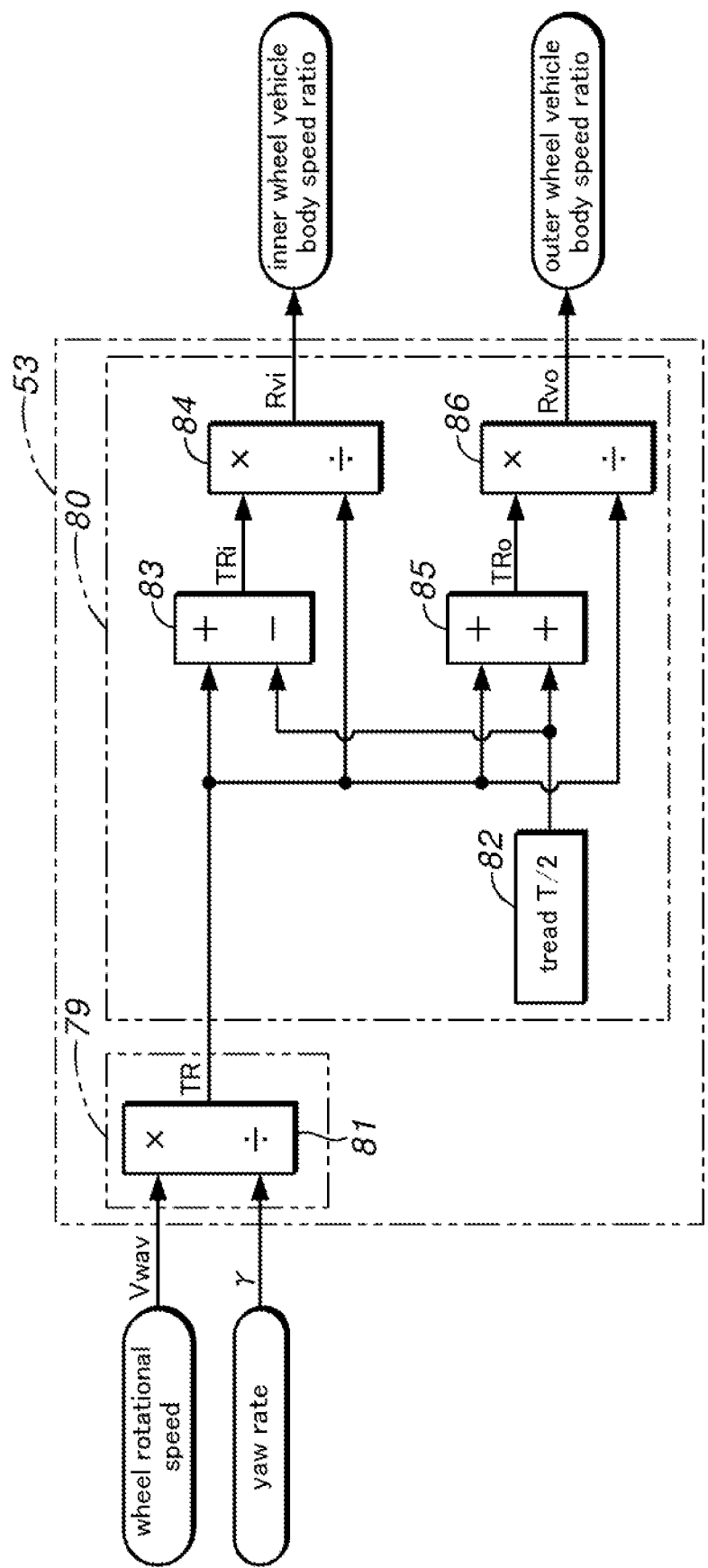
FIG. 10 is a block diagram of the steering correction amount computing unit shown in FIG. 8.

The process that is executed in the steering correction amount computing unit 53 is described in the following with reference to FIG. 10. The average wheel rotational speed Vwav obtained from the wheel rotational speeds Vw detected by the corresponding wheel rotational speed sensors 9 is forwarded to a divider 81 as the numerator. The divider 81 receives the yaw rate γ detected by the yaw rate sensor 11 as the denominator so that the cornering radius TR of the vehicle V can be obtained by dividing the average wheel rotational speed Vwav by the yaw rate γ. When the denominator or the yaw rate γ happens to be zero, the denominator is replaced by a suitable number such as a constant value. The computed cornering radius TR is forwarded to the subtractor 83 (as the minuend) and the adder 85. The subtractor 83 and the adder 85 compute the inner wheel cornering radius Tri and the outer wheel cornering radius Tro by subtracting and adding one half of the tread T stored in memory 82 from and to the received cornering radius TR, respectively. The outputs of the subtractor 83 and the adder 85 are forwarded to dividers 84 and 86, respectively, as numerators. The dividers 84 and 86 receive the cornering radius TR of the vehicle V computed by the divider 81 so that the inner wheel vehicle body speed ratio Rvi and the outer wheel vehicle body speed ratio Rvo are computed by dividing the inner wheel cornering radius Tri and the outer wheel cornering radius Tro by the cornering radius TR of the vehicle V, respectively.

The inner wheel vehicle body speed ratio Rvi and the outer wheel vehicle body speed ratio Rvo computed by the dividers 84 and 86 are forwarded to the vehicle body speed correcting unit 54 where the inner wheel side vehicle body speed Vbi (or the vehicle body speed of the part corresponding to the inner wheel) and the outer wheel side vehicle body speed Vbo (or the vehicle body speed of the part corresponding to the outer wheel) are computed by multiplying the vehicle body speed Vb by the inner wheel side vehicle body speed Vbi and the outer wheel side vehicle body speed Vbo, respectively. In other words, the vehicle body speed correcting unit 54 serves as a correcting means for correcting the vehicle body speed Vb according to the inner wheel vehicle body speed ratio Rvi and the outer wheel vehicle body speed ratio Rvo.

By thus correcting the vehicle body speed Vb according to the cornering condition of the vehicle V, the vehicle body speeds Vb (Vbi and Vbo) on the inner and outer wheel sides that can change depending on the steering operation of the vehicle operator can be accurately computed.

As shown in FIG. 4, the inner wheel side vehicle body speed Vbi and the outer wheel side vehicle body speed Vbo are forwarded to the state variable computing unit 31 or more specifically to the subtractor 35 provided on the input side of the band pass filter 36 as the subtrahend to be used for computing the wheel rotational speed variation ΔVw from each wheel rotational speed Vw and canceling the wheel rotational speed variation component owing to the vehicle body speed variation component and the difference in the cornering radius between the inner wheel and outer wheel.

Because the influences of the brake/drive force of the vehicle V from the wheel rotational speeds Vw are canceled by subtracting the inner wheel side vehicle body speed Vbi or the outer wheel side vehicle body speed Vbo from each wheel rotational speed Vw in the state variable computing unit 31, the state variables of the vehicle V (such as the sprung velocity $S_2$ and the stroke speed Ss) can be computed at a high precision. Because the vehicle body speed correcting unit 54 corrects the vehicle body speed Vb according to the inner wheel vehicle body speed ratio Rvi and the outer wheel vehicle body speed ratio Rvo, the vehicle body speed Vb can be computed at a high precision by taking into account the vehicle body speeds at the different wheel positions so that the state variables of the vehicle V can be computed at a high precision owing to the elimination of the influences of the cornering movement of the vehicle V on the wheel rotational speeds Vw.

Figure 11A:
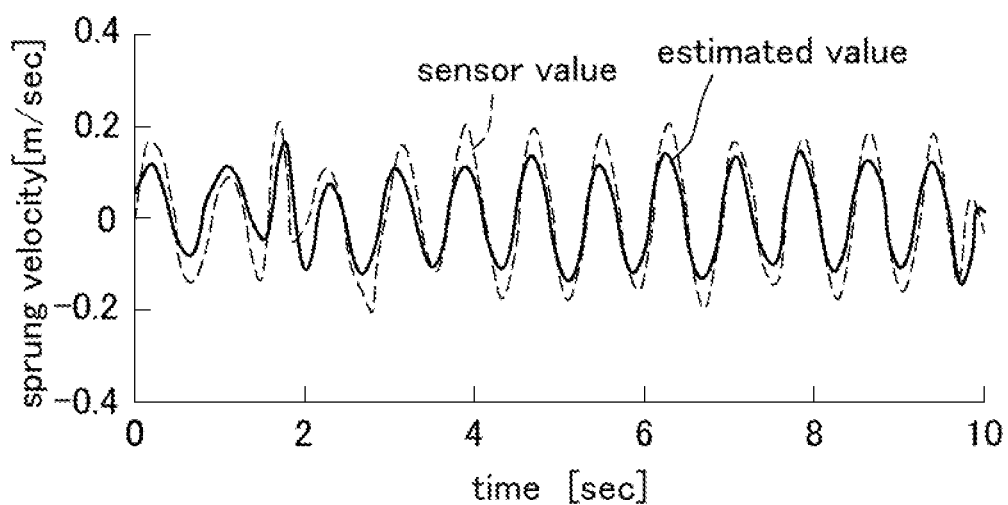
FIG. 11A is a time chart comparing the estimated value of the sprung velocity of the single wheel model shown in FIG. 4 and the sensor value.
Figure 11B:
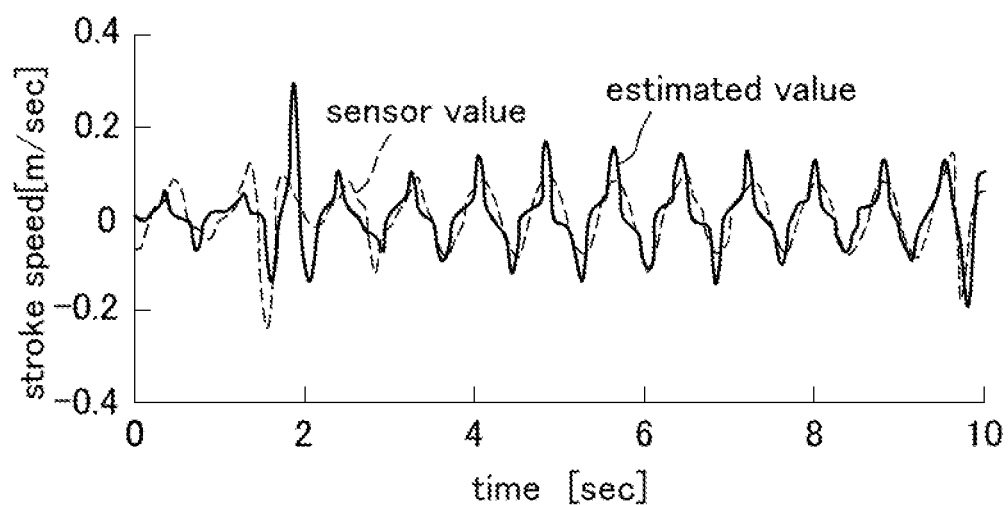
FIG. 11B is a time chart comparing the estimated value of the stroke speed of the single wheel model shown in FIG. 4 and the sensor value.

FIG. 11A is a time chart in which the sprung velocity detected by the sensor and the sprung velocity $S_2$ computed by the state variable computing unit 31 are indicated by broken line and solid line, respectively, and FIG. 11B is a time chart in which the stroke speed detected by the sensor and the stroke speed Ss computed by the state variable computing unit 31 are indicated by broken line and solid line, respectively. As shown in FIG. 11, the computed stroke speed Ss and the sprung velocity $S_2$ substantially agree with the corresponding detected values, and it can be seen that the state variable computing unit 31 can compute the stroke speed Ss and the sprung velocity $S_2$ at a high precision. In the illustrated embodiment, because the unsprung load $u_1$ is computed from the wheel rotational speeds Vw, and is used as the input to the vehicle model, the stroke speed Ss and the sprung velocity $S_2$ can be computed without regard to the caster angle that may be provided in the geometry of the suspension system 7.

<Control Target Current Setting Unit 23>

As shown in FIG. 3, the control target current setting unit 23 includes a skyhook control unit 90 for performing a skyhook control and setting a skyhook control target current Ash, a pitch control unit 91 for performing a pitch control based on a pitch angular velocity ωp and setting a pitch control target current Ap, a roll control unit 92 for performing a roll control based on a roll angular velocity ωr and setting a roll control target current Ar, a steering angle proportional control unit 93 for setting a steering angle proportional control target current Asa, an unsprung damping control unit 95 for performing an unsprung damping control means of the vehicle V and setting an unsprung damping control target current Au, and a minimum target current control unit 96 for setting a minimum target current Amin for generating a minimum damping force depending on the vehicle speed.

The skyhook control unit 90 performs a ride quality control (vibration control) for reducing the vibration of the vehicle as the vehicle travels over a rough road surface and improving the ride quality of the vehicle V. The pitch control unit 91 performs a vehicle body attitude control for stabilizing the attitude of the vehicle body 1 by controlling the pitching motion of the vehicle body 1 at the time of a sudden acceleration or deceleration of the vehicle V. The roll control unit 92 performs a vehicle body attitude control for stabilizing the attitude of the vehicle body 1 by controlling the rolling motion of the vehicle body 1 at the time a cornering of the vehicle V. The unsprung damping control unit 95 controls the resonant vibration of the unsprung mass so that the road grip of the wheels 3 and the ride quality may be improved.

<Skyhook Control Unit 90>

Figure 12:
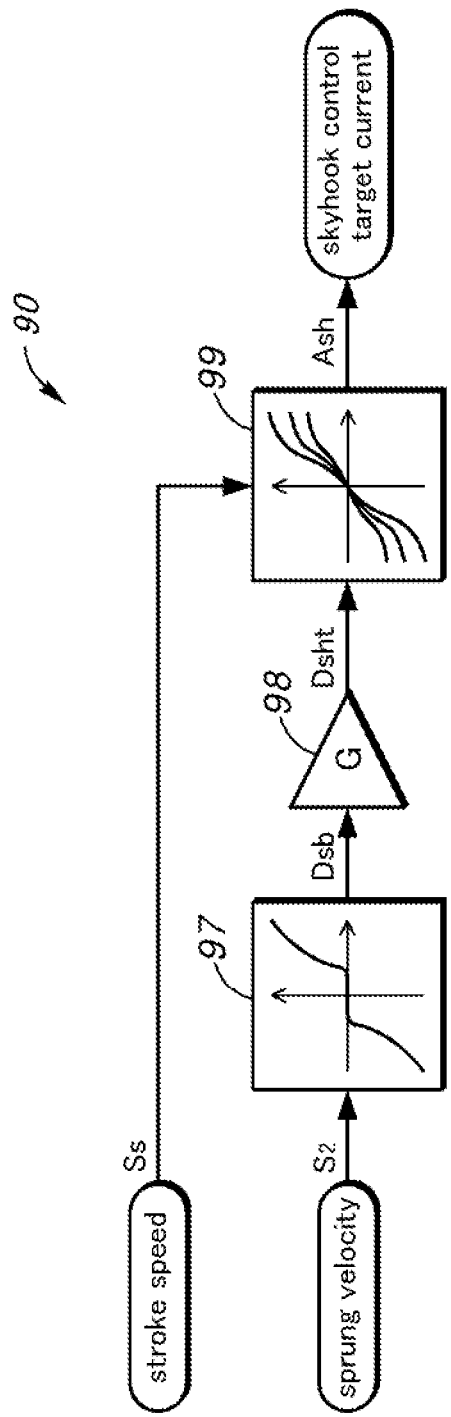
FIG. 12 is a block diagram of the skyhook control computing unit shown in FIG. 3.
Figure 13:
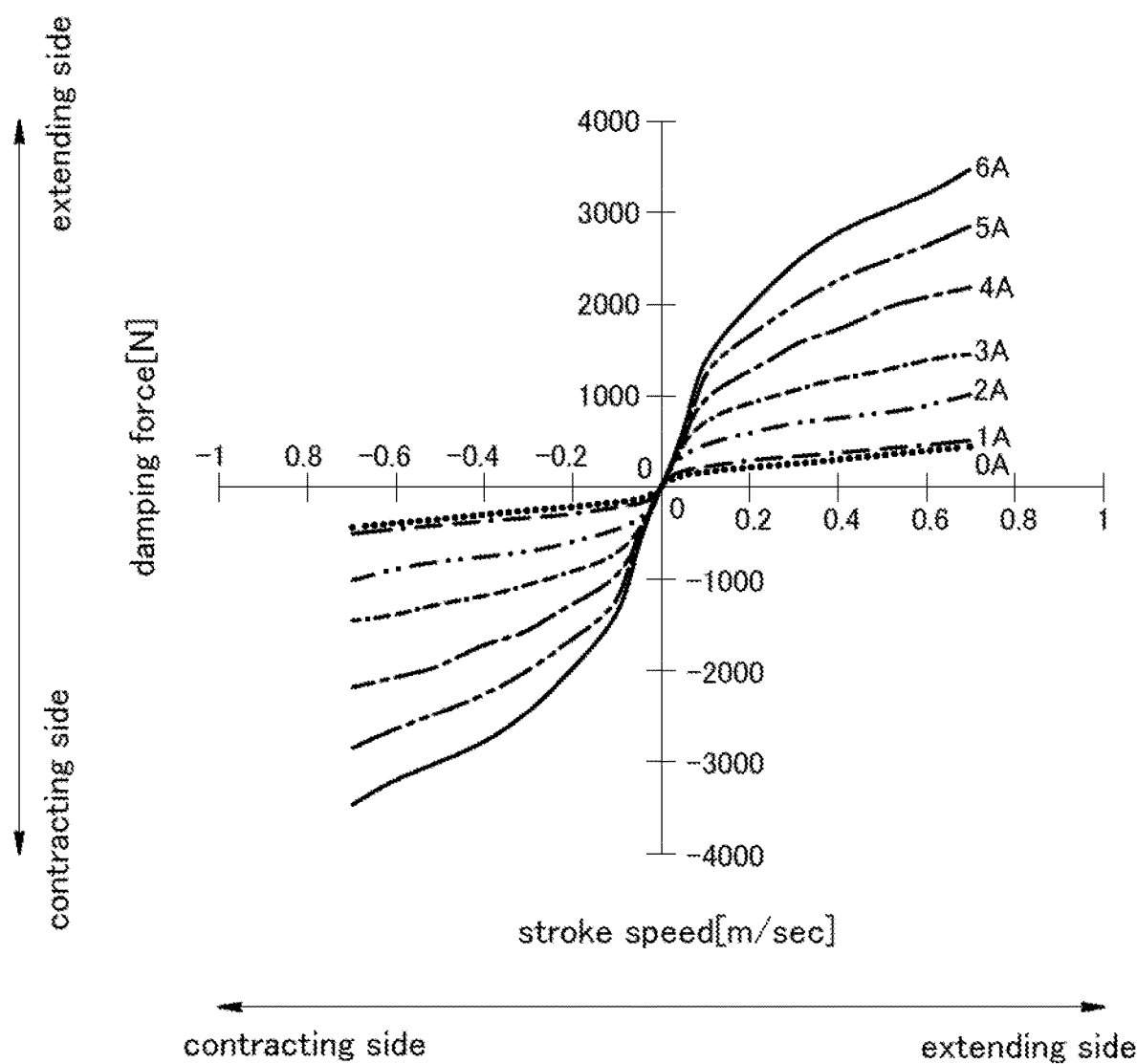
FIG. 13 is a target current map which is used in the target current setting unit shown in FIG. 12.

The process executed in the skyhook control unit 90 is described in the following with reference to FIGS. 12 and 13. The skyhook control unit 90 forwards the sprung velocity $S_2$ computed by the state variable computing unit 31 shown in FIG. 3 to a damping force base value computing unit 97. The damping force base value computing unit 97 sets a damping force base value Dsb according to the received sprung velocity $S_2$ by looking up a sprung velocity—damping force map. The damping force base value Dsb that is set is forwarded to a gain circuit 98 which multiplies the damping force base value Dsb by a skyhook gain Gsh to provide a skyhook target damping force Dsht. The computed skyhook target damping force Dsht is forwarded to a target current setting circuit 99 which also receive the stroke speed Ss. The target current setting circuit 99 sets and produces the skyhook control target current Ash for each damper 6 according to the skyhook target damping force Dsht and the stroke speed Ss by looking up the current map shown in FIG. 13.

<Unsprung Damping Control Unit 95>

Figure 14:
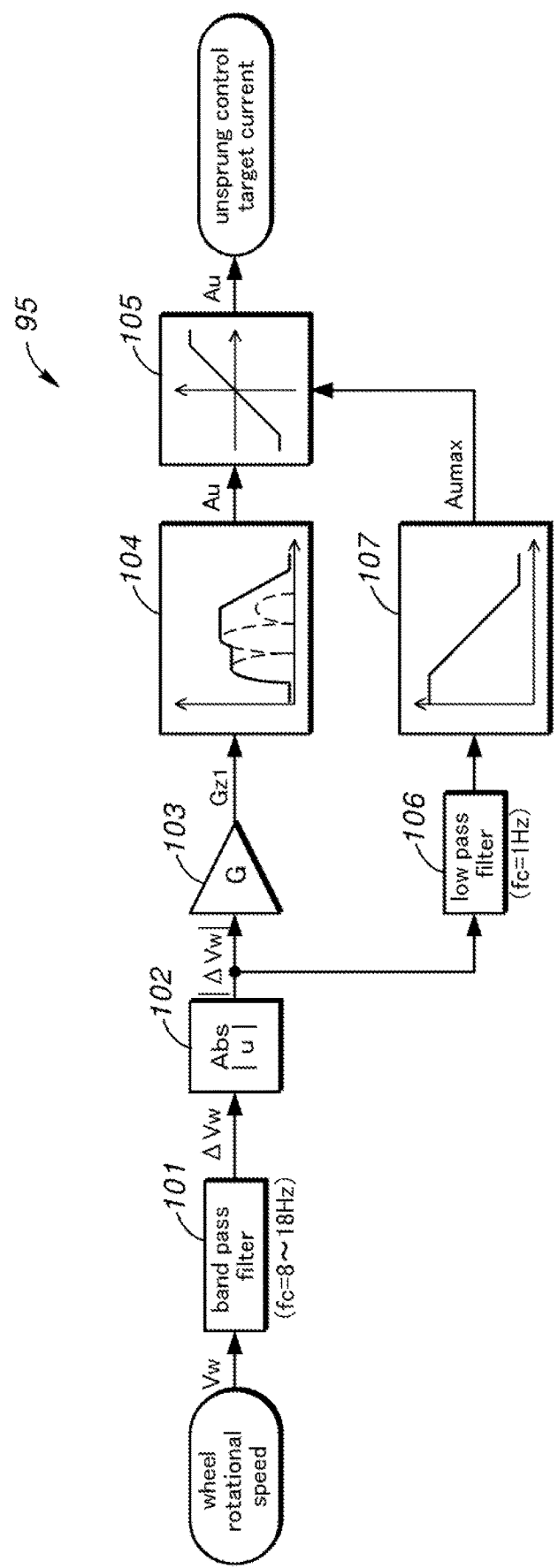
FIG. 14 is a block diagram of the unsprung mass vibration control computing unit shown in FIG. 3.

The unsprung damping control unit 95 shown in FIG. 3 is described in the following with reference to FIGS. 14 to 17. As shown in FIG. 14, in the unsprung damping control unit 95, each received wheel rotational speed Vw is forwarded to a band pass filter 101 which has a band pass property for 8 to 18 Hz to allow the wheel rotational speed Vw signal of the unsprung resonance frequency range to pass through. Therefore, the band pass filter 101 extracts signals of a higher frequency range than that of the band pass filter 36 (FIG. 4) for the skyhook control which has a pass frequency range of 0.5 to 5 Hz. The cut frequency in the high frequency range of the band pass filter 36 for the skyhook control is 5 Hz, and the cut frequency in the low frequency range of the band pass filter 101 for the unsprung damping control means is 8 Hz so that a band gap is created between the two band pass filters 36 and 101, and the mutual interferences between the skyhook control and the unsprung mass vibration control can be avoided.

Figure 15A:
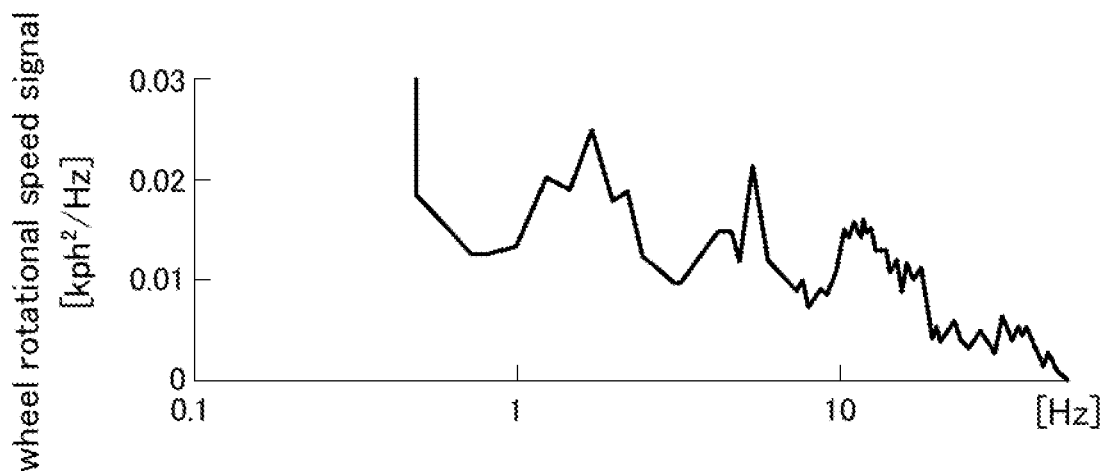
FIG. 15 compares the frequency response diagrams of the wheel rotational speed and the unsprung acceleration.
Figure 15B:
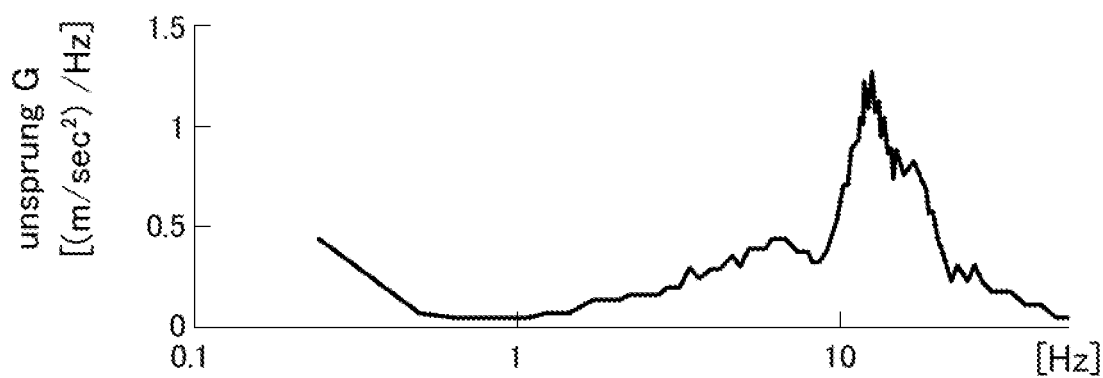

The wheel rotational speed signals Vw received from the CAN 13 may contain signals of frequencies other than those within the unsprung resonance frequency ranges. For instance, the wheel rotational speed signal Vw having the frequency property shown in FIG. 15A and obtained when the vehicle was traveling at 40 km/h contains the components belonging to the unsprung resonance frequency range which is shown in FIG. 15B. Therefore, the wheel rotational speed signal Vw is passed through the band pass filter 101 corresponding to the unsprung resonance frequency range so that the unsprung resonance frequency component is extracted from the wheel rotational speed signal Vw, and the DC component is removed from the wheel rotational speed signal Vw. In other words, the band pass filter 101 serves as a wheel rotational speed variation extracting means for extracting the wheel rotational speed variation $\Delta$Vw from the wheel rotational speed signal Vw.

The wheel rotational speed variation $\Delta$Vw that has passed through the band pass filter 101 is forwarded to an absolute value computing circuit 102 to be converted into the absolute value of the wheel rotational speed variation $\Delta$Vw. The wheel rotational speed variation $\Delta$Vw is proportional to the unsprung load $u_1$, and the vertical acceleration of the unsprung mass obtained by dividing the unsprung load $u_1$ by the unsprung mass $M_1$ also corresponds to the wheel rotational speed variation $\Delta$Vw. Thus, the unsprung vibration can be controlled by producing a damping force that corresponds to the absolute value of the vertical acceleration.

The absolute value of the wheel rotational speed variation $\Delta$Vw produced from the absolute value computing circuit 102 is multiplied by a gain in the gain circuit 103 to provide the absolute value of the unsprung acceleration $Gz_1$ which is the basic input value of the vehicle V. More specifically, the gain obtained by dividing the proportional constant k discussed earlier in conjunction with FIG. 6 by the unsprung mass $M_1$ is multiplied to the absolute value of the wheel rotational speed variation $\Delta$Vw.

The unsprung acceleration $Gz_1$ produced from the gain circuit 103 is forwarded to a target current setting circuit 104 which computes a current corresponding to the unsprung acceleration $Gz_1$. The unsprung damping control target current Au is determined by performing a peak hold/ramp down control on the computed current.

Figure 16A:
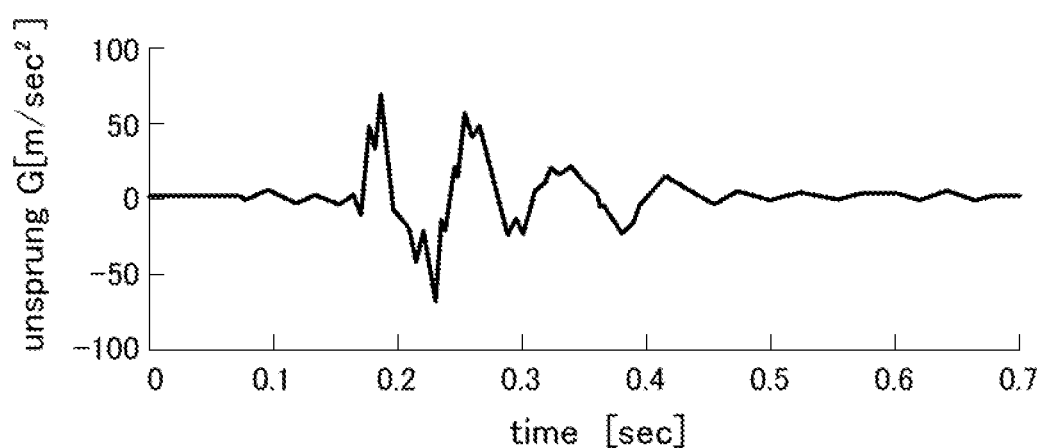
FIG. 16 compares the time charts of the unsprung acceleration and the target current processed by the peak hold ramp down circuit shown in FIG. 14.
Figure 16B:
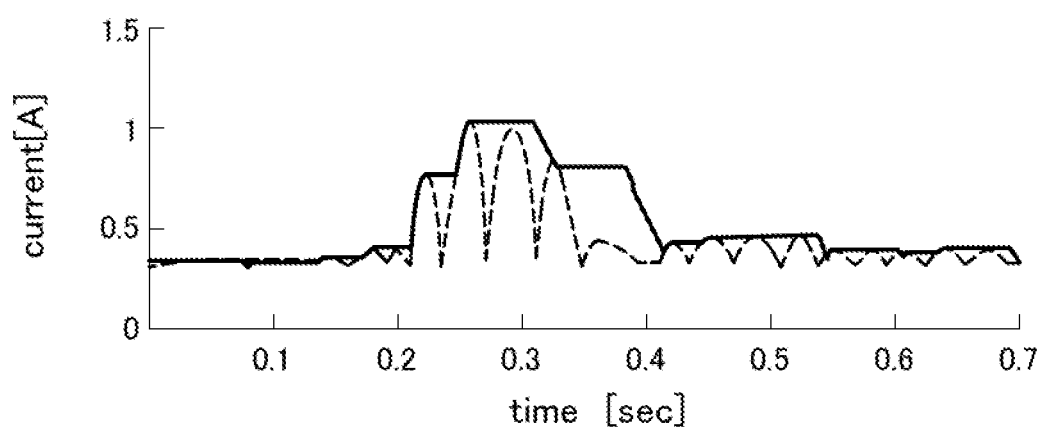

The target current setting circuit 104 determines the unsprung damping control target current Au as indicated by the solid line in FIG. 16B according to the computed current as indicated by the broken line in FIG. 16B for the given input of the unsprung acceleration $Gz_1$ having the property as shown in FIG. 16A. More specifically, the target current setting circuit 104 holds the maximum value of the received computed current as the unsprung damping control target current Au for a prescribed time period, and upon elapsing of the prescribed time period, decreases (or ramps down) the value of the unsprung damping control target current Au at a prescribed rate. In other words, when the unsprung acceleration $Gz_1$ is on the increase, the value of the unsprung damping control target current Au is selected so as to quickly respond to the unsprung acceleration $Gz_1$. When the unsprung acceleration $Gz_1$ is on the decrease, the value of the unsprung damping control target current Au is selected so as to respond comparatively slowly to the unsprung acceleration $Gz_1$. As a result, the unsprung vibration is caused to damp out more rapidly as compared to the case where the unsprung damping control target current Au is selected as indicated by the broken line.

Referring to FIG. 14 once again, the unsprung damping control target current Au produced from the target current setting circuit 104 is forwarded to a limiting circuit 105. The limiting circuit 105 limits the upper limit of the unsprung damping control target current Au to an upper limit value Aumax, and produces the limited unsprung damping control target current Au. In other words, the limiting circuit 105 sets the upper limit value Aumax to the damping control target current Au when the received unsprung damping control target current Au exceeds the upper limit value Aumax. Thereby, the unsprung damping control target current Au which is set according to the magnitude of the wheel speed variation $\Delta$Vw is prevented from exceeding the upper limit value Aumax which is determined by taking into account the power supply capacity of the vehicle V and the damping property of the damper 6.

The wheel speed variation $\Delta$Vw produced from the absolute value computing circuit 102 is supplied not only to the gain circuit 103 but also to a low-pass filter 106. The low-pass filter 106 has the low pass property to pass the frequency range of 1 Hz or lower. An upper limit setting circuit 107 sets the upper limit value Aumax according to the absolute value of the wheel speed variation $\Delta$Vw passed through the low-pass filter 106, and forwards the upper limit value Aumax to the limiting circuit 105. Specifically, the upper limit setting circuit 107 sets the upper limit value Aumax such that the upper limit value Aumax becomes smaller as the wheel speed variation $\Delta$Vw increases when the absolute value of the wheel speed variation $\Delta$Vw is greater than a predetermined value.

The limiting circuit 105 changes the upper limit of the unsprung damping control means target current Au in accordance with the upper limit value Aumax that is received. More specifically, the upper limit Aumax is made smaller with the increase in the absolute value of the wheel speed variation $\Delta$Vw that has passed through the low-pass filter 106. The significance of this point is discussed in the following.

Figure 17A:
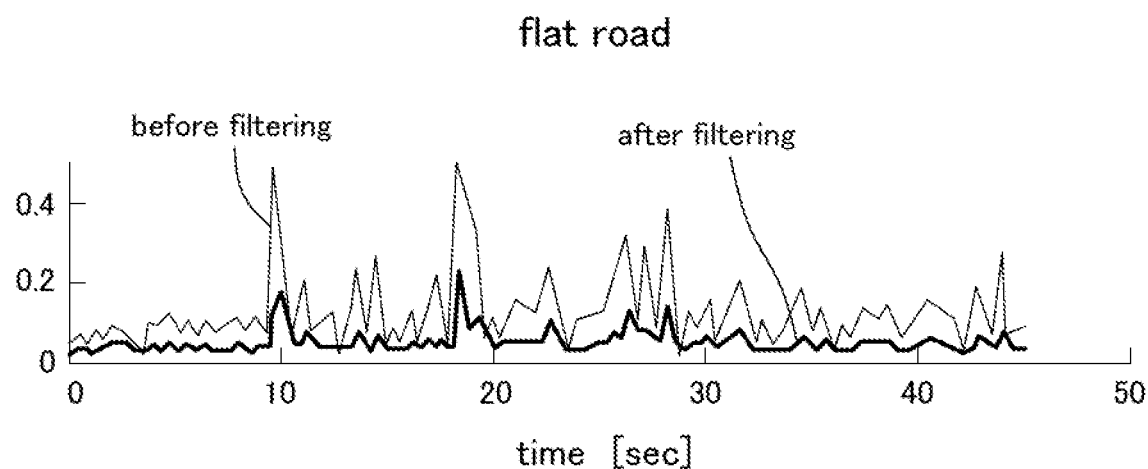
FIG. 17A is a time chart of the wheel rotational speed variation when traveling over a smooth road surface before and after the low-pass filter processing.
Figure 17B:
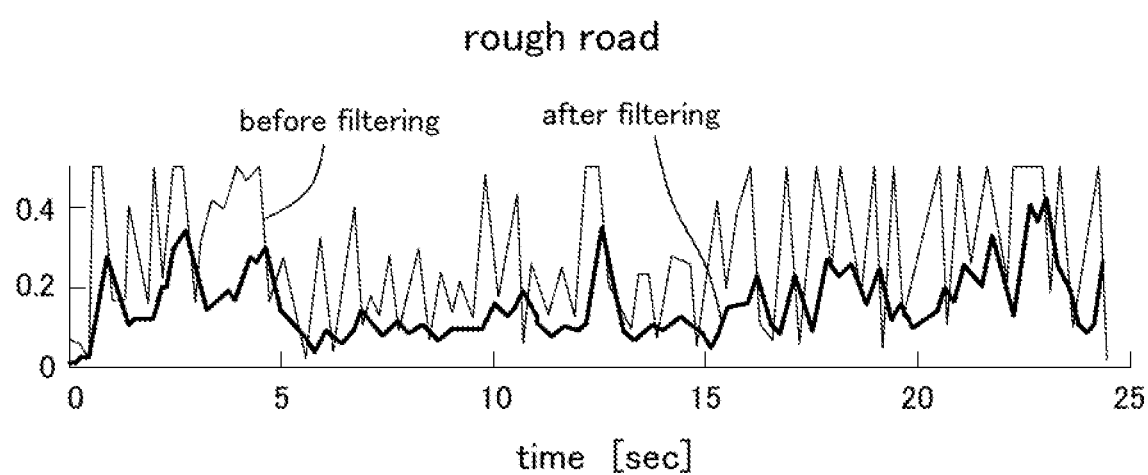
FIG. 17B is a time chart of the wheel rotational speed variation when traveling over a rough road surface before and after the low-pass filter processing.

When the vehicle is traveling over a relatively smooth paved road, the wheel speed variation $\Delta$Vw (absolute value) after being processed by the low-pass filter 106 indicated by the solid line in FIG. 17A is smaller than the wheel speed variation $\Delta$Vw before being processed by the low-pass filter 106 indicated by the thin line, and this is also true with the average values. In contrast, when the vehicle is traveling over a rough road surface, as shown in FIG. 17B, the absolute value of the wheel rotational speed variation ΔVw is great. Therefore, the limiting circuit 105 reduces the unsprung damping control target current Au (weakens the unsprung damping control) so that the unsprung damping control target current Au is reduced, and the impairment of the ride quality can be avoided.

Thus, the unsprung damping control unit 95 can be configured such that the unsprung damping control target current Au is set in dependence on the wheel rotational speed Vw signal. Thereby, the unsprung damping control target current Au is determined in dependence on the magnitude of the unsprung resonance range component of the wheel speed variation ΔVw, and the unsprung damping control can be performed without the intervention of external factors such as the influences from the sprung mass.

<Current Holding Unit 24>

Referring to FIG. 3 once again, the current holding unit 24 produces a current holding signal Sfix when a signal indicating that any of the VSA, ABS and TCS is in operation is received by the input unit 21, indicating that the behavior of the vehicle V is unstable. The produced current holding signal Sfix is forwarded to the damper control unit 25.

<Damper Control Unit 25>

The damper control unit 25 includes a high current selection unit 108 and a current control unit 109. The high current selection unit 108 sets the greatest of the values of the skyhook control target current Ash, the pitch control target current Ap, the roll control target current Ar, the steering angle proportional control target current Asa, the unsprung damping control target current Au and the minimum target current Amin as the target current Atgt.

The current control unit 109 receives the target current Atgt and the current holding signal Sfix. The current control unit 109 controls the damping force of the damper 6 by generating a drive current to each damper 6 based on the target current Atgt set by the high current selection unit 108 when the current holding signal Sfix is not received. On the other hand, when the current holding signal Sfix is received, the current control unit 109 holds the electric current (or holds the damping coefficient of each damper 6 to a predetermined value) based on the value of the target current Atgt immediately before the current holding signal Sfix is received to prevent the damping force of the damper 6 from changing abruptly, and controls the damping force of the damper 6 by generating the drive current for the damper 6 based upon the fixed target current Atgt.

The current control unit 109 maintains the target current Atgt to a fixed value during the time the current holding signal Sfix is being received. The target current Atgt may also continue to be fixed to the constant value for a prescribed period of time following the loss of the current holding signal Sfix.

<<Damping Force Control Process>>

Figure 18:
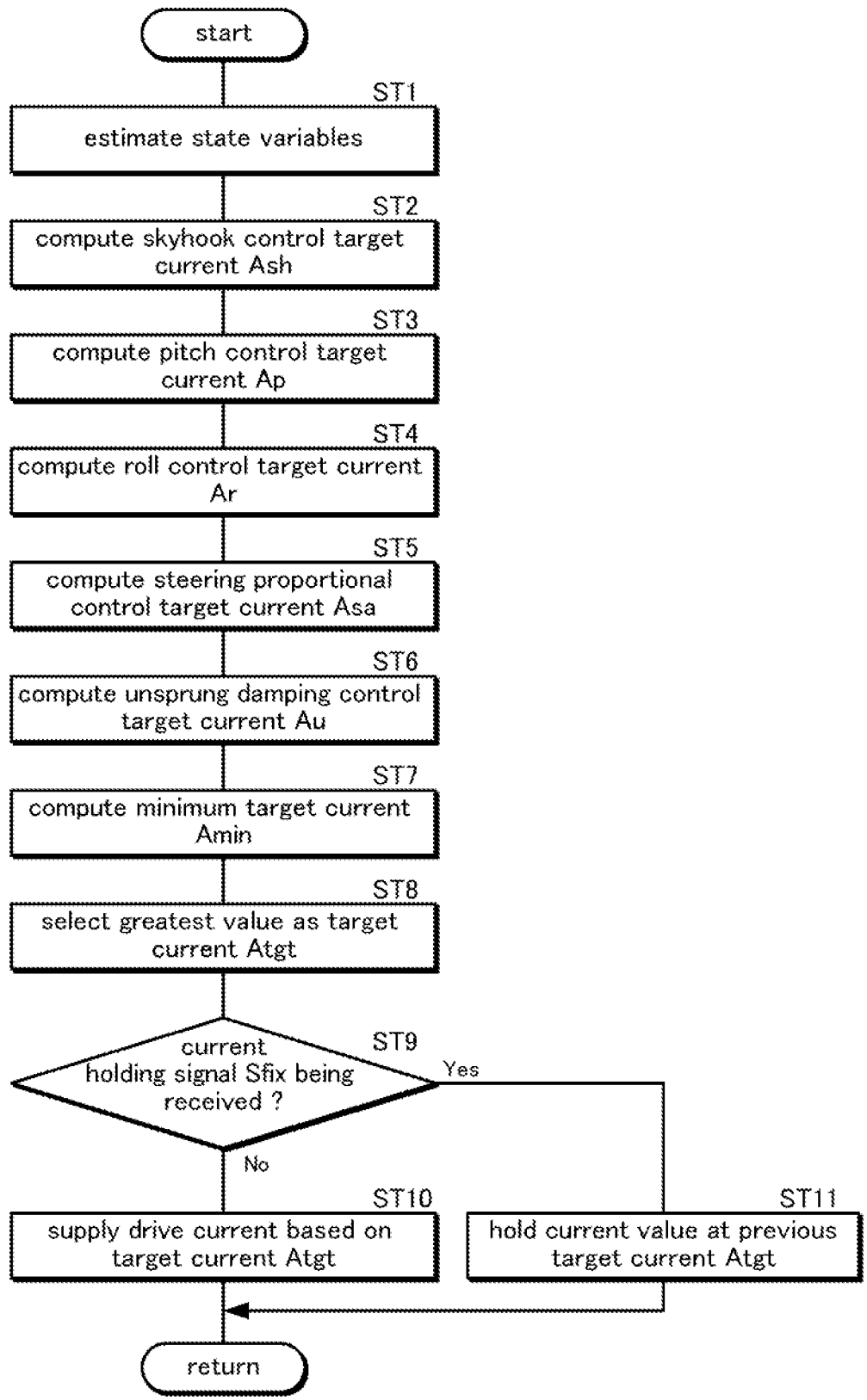
FIG. 18 is a flowchart showing the process of controlling the damping force by the suspension control system shown in FIG. 3.

The ECU 8 having the structure discussed above performs the damping force control according to the basic procedure described in the following. When the vehicle V starts traveling, the ECU 8 executes the damping force control according to the procedure shown in the flowchart of FIG. 18 at a prescribed processing interval (10 ms, for instance). Upon starting the damping force control, the ECU 8 computes the unsprung load $u_1$ on the basis of various detection values such as the detection value of each wheel rotational speed sensor 9, and the state variables (the sprung velocity $S_2$ and the stroke speed Ss of each wheel, and the roll angular velocity ωr, and the pitch angular velocity ωp of the vehicle body 1) of the vehicle V from the computed unsprung load $u_1$ and the detection signal of the lateral G sensor 10 (step ST1).

Then, the ECU 8 computes the skyhook control target current Ash of each damper 6 based on the sprung velocity $S_2$ and the stroke speed Ss (step ST2), computes the target current Ap for each damper 6 from the pitch angular velocity ωp of the vehicle body 1 (step ST3), computes the roll control target current Ar from the roll angular velocity ωr of the vehicle body 1 (step ST4), computes the steering proportional control target current Asa for each damper from the steering angle δf (step ST5), computes the unsprung damping control target current Au for each damper 6 from the wheel rotational speed Vw of the corresponding wheel (step ST6), and computes the minimum target current Amin for each damper 6 from the wheel rotational speed Vw of the corresponding wheel (step ST7). The processing in steps ST2 to ST7 is not required to be performed in this order, and may also be performed simultaneously.

Then, the ECU 8 sets the target current Atgt to the largest of the values of the six control target current Ash, Ap, Ar, Asa, Au and Amin for each wheel (step ST8). The ECUS determines if the current holding signal Sfix is being received (step ST9). If this determination result is No (or if none of the VSA, ABS and TCS is in operation), the drive current based on the target current Atgt that was selected in step ST8 is forwarded to the MLV coil of the corresponding damper 6 (step ST10). As a result, an optimum target damping force corresponding to the load of the damper 6 is selected in the damping force control so that a favorable driving stability and an improved ride quality can be achieved.

On the other hand, if the determination result in step ST9 is Yes (or if at least one of the VSA, ABS and TCS is in operation), the ECU 8 supplies the drive current based on the target current Atgt that was selected in the previous control cycle to the MLV coil of the corresponding damper 6 (step ST11). As a result, if any of the VSA, ABS and TCS is in operation, the target current Atgt that was selected in step ST8 is prevented from making a sudden change so that the vehicle behavior is prevented from becoming unstable.

Second Embodiment

A second embodiment of the suspension control device according to the present invention is described in the following with reference to FIG. 19. In the following description, the parts corresponding to those of the first embodiment are denoted with like numerals without necessarily repeating the description of such parts.

<<ECU 8>>

Figure 19:
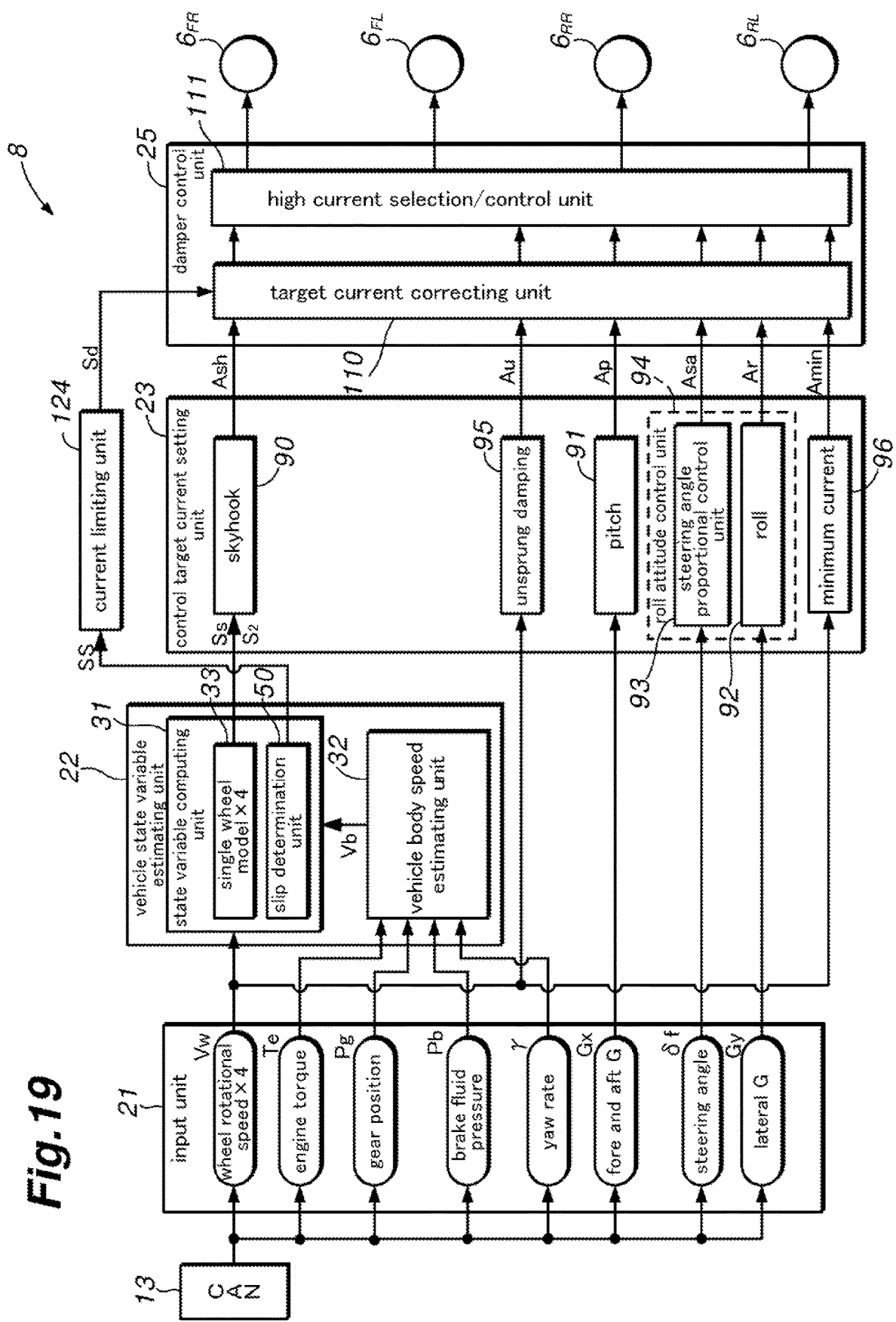
FIG. 19 is a block diagram showing the overall structure of a suspension control system given as a second embodiment of the present invention.

In this embodiment, as shown in FIG. 19, the input unit 21 of the ECUS receives, in addition the wheel speed Vw, the lateral acceleration Gy, the drive torque Te, the gear position Pg, the brake fluid pressure Pb, the yaw rate γ, the steering angle δf, and the VSA, ABS and TCS flags that appeared in the first embodiment, a fore and aft acceleration Gx from the fore and aft G sensor provided on the vehicle body 1 but not shown in the drawings.

The vehicle state variable estimating unit 22 includes a state variable computing unit 31 and a vehicle body speed estimating unit 32, and the vehicle body speed estimating unit 32 includes an accelerating/decelerating force computing unit 51 and a steering correction amount computing unit 53 (although not shown in the drawings) similarly as the first embodiment. Meanwhile, the state variable computing unit 31 is not provided with a four wheel model computing unit 34, and is provided only with four single wheel model computing units 33 and a slip determination unit 50. The sprung velocity $S_2$ and the stroke speed Ss computed by the vehicle state variable estimating unit 22 are used to compute the skyhook control target current Ash in the skyhook control unit 90, similarly as in the first embodiment.

The pitch control unit 91 of the present embodiment sets the pitch control target current Ap by using the differential value of the fore and aft acceleration Gx detected by the fore and aft G sensor. The roll control unit 92 sets the roll control target current Ar by using the differential value of the lateral acceleration Gy detected by the lateral G sensor 10. The unsprung damping control unit 95 sets the unsprung target damping control current Au based on the wheel rotational speed Vw of each wheel similarly as in the first embodiment.

Further, in this embodiment, a current limit unit 124 is provided, instead of the current holding unit 24 of the first embodiment. The signal indicating the operation of the ABS, TCS and VSA is not forwarded to the input unit 21, and the current limit unit 124 receives the slip signal SS directly from the slip determination unit 50. The slip signal SS is also forwarded to a vehicle behavior control unit (not shown in the drawings) that controls the ABS, TCS and VSA so that the vehicle behavior control unit performs the control of the ABS, TCS and VSA in response to an input of the slip signal SS. Meanwhile, if the slip signal is received, based on the assumption that the behavior of the vehicle V is unstable, the current limit unit 124 produces a suppression signal Sd to suppress the control target current in a prescribed manner.

The damper control unit 25 of this embodiment includes a target current correcting unit 110 and a high current selection/control unit 111, instead of the high current selection unit 108 and the current control unit 109 of the first embodiment. The skyhook control target current Ash, the unsprung damping control target current Au, the pitch control target current Ap, the steering angle proportional control target current Asa, the roll control target current Ar and the minimum target current Amin are forwarded to the high current selection/control unit 111 via the target current correcting unit 110.

The target current correcting unit 110 additionally receives a limit signal Sd from a current limit unit 124. Upon receiving the limit signal Sd, the target current correcting unit 110 limits or corrects the skyhook control target current Ash and the unsprung target damping control current Au by fixing the values thereof at their values immediately preceding the reception of the limit signal Sd, respectively (or by fixing the damping coefficient of the damper 6 at a prescribed value).

The high current selection/control unit 111 sets the target current Atgt to the greatest of the six control target currents Ash, Ap, Ar, Asa, Au and Amin produced from the target current correcting unit 110 for each wheel, and controls the damping force of the damper 6 by producing the drive current for the corresponding damper 6 according to the set target current Atgt. By thus causing the high current selection/control unit 111 to select the skyhook control target current Ash and the unsprung target damping control current Au that are corrected by the target current correcting unit 110, the skyhook control target current Ash and the unsprung target damping control current Au which could be selected on the basis of the wheel rotational speed Vw of the wheel under a slip condition are prevented from abruptly changing the damping force of the corresponding damper 6.

In the illustrated embodiment, because the target current correcting unit 110 corrects only the skyhook control target current Ash and the unsprung target damping control current Au, but does not correct the unsprung damping control target current Au, the pitch control target current Ap, the steering angle proportional control target current Asa, the roll control target current Ar or the minimum target current Amin, even when the vehicle behavior is disturbed, for instance by a rolling movement, an appropriate roll control target current Ar is produced so as to minimize the influences of the disturbance, and the controlling performance of the VSA or the like can be improved.

As a variation of the target current correcting unit 110, upon receiving the limit signal Sd, the target current correcting unit 110 may limit the skyhook control target current Ash and the unsprung target damping control current Au at fixed values, and multiply an attenuation gain to each of the steering angle proportional control target current Asa, the roll control target current Ar or the minimum target current Amin for restricting the control action. By so doing, the control amount of each damper may be reduced as a whole when the vehicle behavior tends to be unstable.

Alternatively, upon receiving the limit signal Sd, the target current correcting unit 110 may limit the skyhook control target current Ash and the unsprung target damping control current Au to fixed values, and hold the pitch control target current Ap, the steering angle proportional control target current Asa, the roll control target current Ar and the minimum target current Amin at the values thereof immediately preceding the reception of the limit signal Sd, respectively (or by holding the damping coefficient of the damper 6 at a prescribed value). By so doing, the control amount of each damper may be reduced in a reliable manner when the vehicle behavior tends to be unstable.

In any of these cases, similarly as in the first embodiment, the time period (time duration) in which the current control unit 109 keeps or limits each of the control target currents at a fixed value can be made to coincide with the duration of receiving the limit signal Sd or until a short time period has elapsed following the loss of the limit signal Sd.

The current control unit 109 not only may maintain each control target current at (limit each control target current to) a fixed value for a prescribed time period, but also may initially gradually reduce each control target current, and then fix the control target current at a fixed level, or may initially fix the control target current at a fixed level and then gradually reduce the control target current. Thus, each control target current may be limited under the control of the control target current setting unit 23 in various manners. By causing the control amount to converge to a fixed level after elapsing of a prescribed time period, the vehicle behavior may be favorably stabilized.

<<Damping Force Control Process>>

Figure 20:
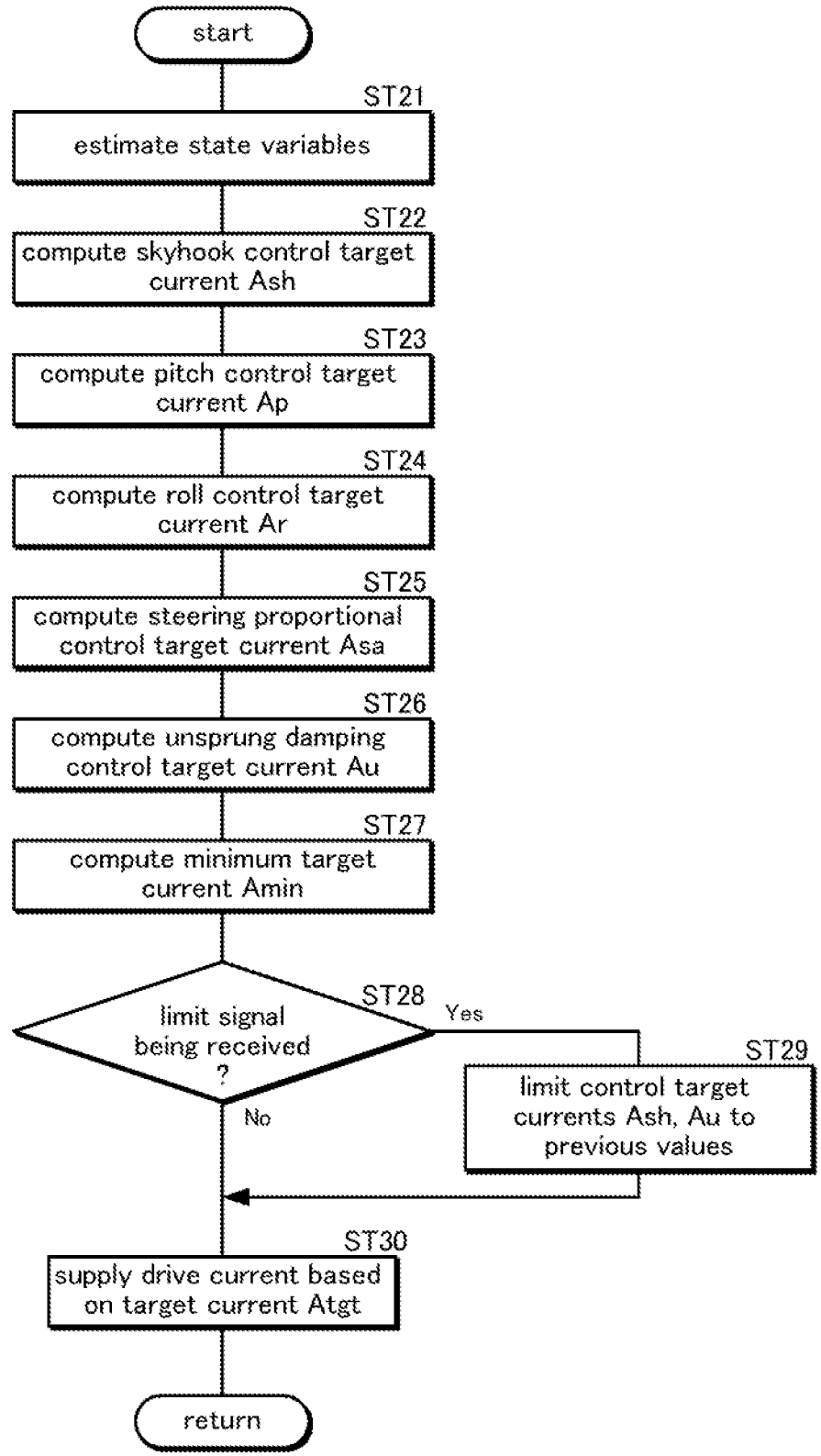
FIG. 20 is a flowchart showing the process of controlling the damping force by the suspension control system shown in FIG. 19.

The damping force control process executed by the ECU 8 according to the second embodiment of the present invention is described in the following with reference to FIG. 20.

Upon starting of the damping force control process, the ECU 8 computes the unsprung load $u_1$ for each wheel according to the detection value of the corresponding wheel rotational speed sensor 9, and computes the dynamic state variables of the vehicle V (such as the sprung mass velocity $S_2$ and the stroke speed Ss of each wheel) according to the computed unsprung load $u_1$ (step ST21).

The ECU 8 then computes the skyhook control target current Ash for each damper 6 according to the sprung mass velocity $S_2$ and the stroke speed Ss (step ST22), computes the pitch control target current Ap of each damper 6 according to the differential value of the fore and aft acceleration Gx (step ST23), computes the roll control target current Ar for each damper 6 according to the differential value of the lateral acceleration Gy (step ST24), computes the steering angle proportional control target current Asa for each damper 6 according to the steering angle δf (step ST25), computes the unsprung damping control target current Au for each damper 6 according to the wheel rotational speed Vw of the corresponding wheel (step ST26), and computes the minimum target current Amin for each damper 6 according to the wheel rotational speed Vw of the corresponding wheel (step ST27). These steps ST22 to ST27 are not necessarily required to be performed in this order, and may also be performed simultaneously.

The ECU 8 determines if the limit signal Sd is being received (step ST28). If the determination result is No (or if no slip condition is determined), the ECU 8 sets the greatest of the six control target currents Ash, Ap, Ar, Asa, Au and Amin which were set for each wheel in steps ST21 to ST27, and forwards a corresponding drive current to the MLV coil of the corresponding damper according to the target current Atgt (step ST30). As a result, the damping force control allows the optimal target damping force to be set for the given load of the damper 6, and both the driving stability and the ride quality can be improved.

On the other hand, if the determination result is Yes in step ST29 (or a slip condition is determined), the skyhook control target current Ash and the unsprung target damping control current Au are corrected (limited) depending on the previous values (step ST29), the greatest of the six control target currents Ash, Ap, Ar, Asa, Au and Amin is set as the target current Atgt for each wheel, and the drive current is forwarded to the MLV coil of the corresponding damper 6 according to the target current Atgt (step ST30). As a result, when the vehicle V is under a slip condition, and at least one of the VSA, ABS and TCS are in operation, sudden changes in the skyhook control target current Ash and the unsprung target damping control current Au are prevented from causing a sudden change in the target current Atgt of each damper, and a resulting destabilization of the behavior of the vehicle.

Third Embodiment

A third embodiment of the suspension control system according to the present invention is described in the following with reference to FIGS. 21 to 25. In the following description, the parts corresponding to those of the first embodiment are denoted with like numerals without necessarily repeating the description of such parts.

Figure 21:
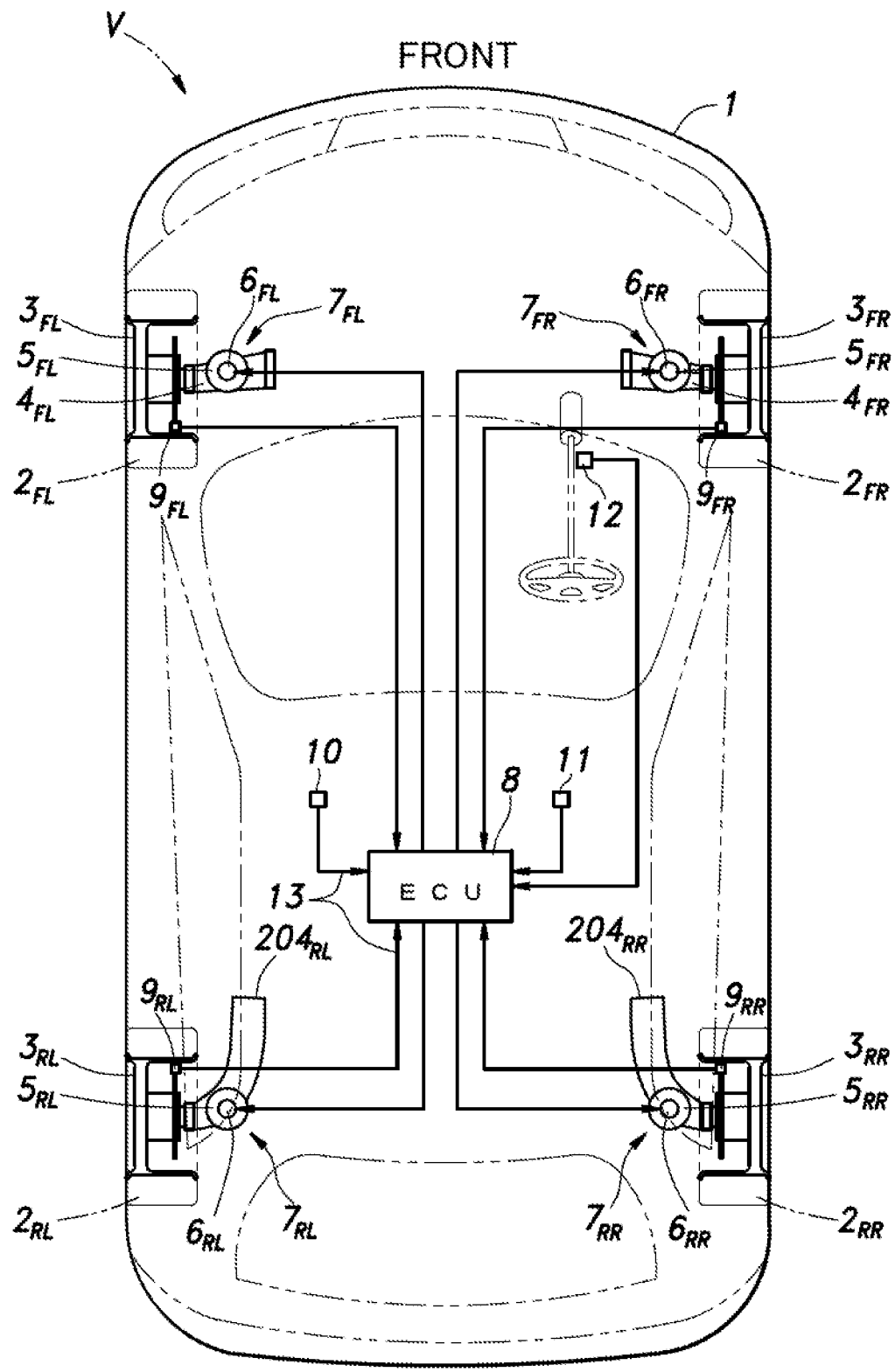
FIG. 21 is a block diagram showing the overall structure of a suspension control system given as a third embodiment of the present invention.
Figure 22:
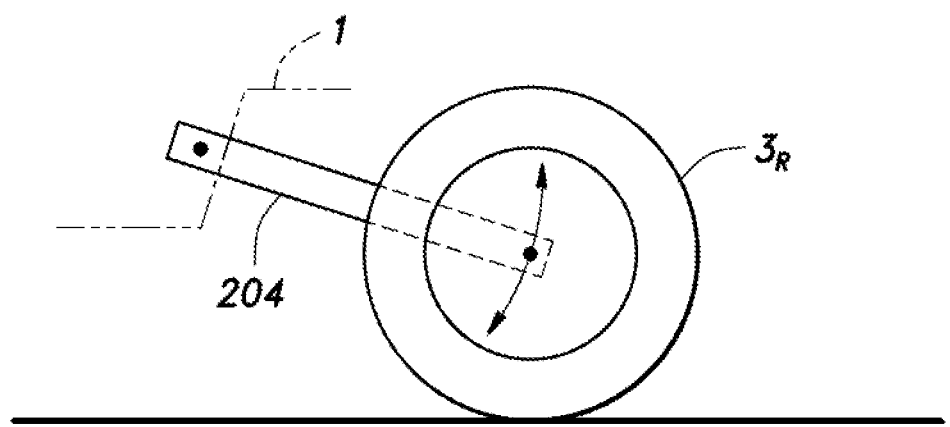
FIG. 22 is a simplified side view of the rear wheel suspension shown in FIG. 21.

Referring to FIG. 21, in the third embodiment, the suspension system $7_R$ for the rear wheels $3_R$ consists of a trailing arm suspension system using a trailing arm 204 for connecting each rear wheel $3_R$ to the vehicle body 1. Alternatively, each rear wheel $3_R$ may be connected to the vehicle body 1 via the corresponding trailing arm part of a torsion beam suspension system. As shown in FIG. 22, the front end of the trailing arm 204 is pivotally connected to the vehicle body 1, and the rear end of the trailing arm 204 rotatably supports the rear wheel $3_R$. Therefore, as the stroke of the damper 6 changes owing to the input from the road surface or the like, the rear wheel $3_R$ swings along an arc centered around the front end of the trailing arm 204 so that the rear wheel $3_R$ moves not only vertically but also in the fore and aft direction. The fore and aft movement of the rear wheel $3_R$ contributes to the wheel rotational speed variation ΔVw, and may impair the precision in the values that may be computed from the wheel rotational speed variation ΔVw.

Based on this recognition, in this embodiment, while the unsprung load $u_1$ of the front wheel $3_F$ is computed from the detection value of the wheel rotational speed sensor $9_F$ similarly as in the previous embodiments, and the sprung velocity $S_2$ and the stroke speed Ss are computed from the unsprung load $u_1$, a different process is used from computing the sprung velocity $S_2$ and the stroke speed Ss of each rear wheel as will be described hereinafter.

The sprung velocity $S_2$ and the stroke speed Ss for each rear wheel are computed without using the wheel rotational speeds Vw of the rear wheels $3_R$, but each rear wheel $3_R$, is fitted with a wheel rotational speed sensor 9 because the computation of the average wheel rotational speed Vwav, the unsprung damping control performed by the unsprung damping control unit 95, the setting of the minimum target current Amin performed by the minimum target current control unit 96, and the control units for the ABS, the TCS and the VSA require the wheel rotational speeds Vw of the rear wheels $3_R$.

Figure 23:
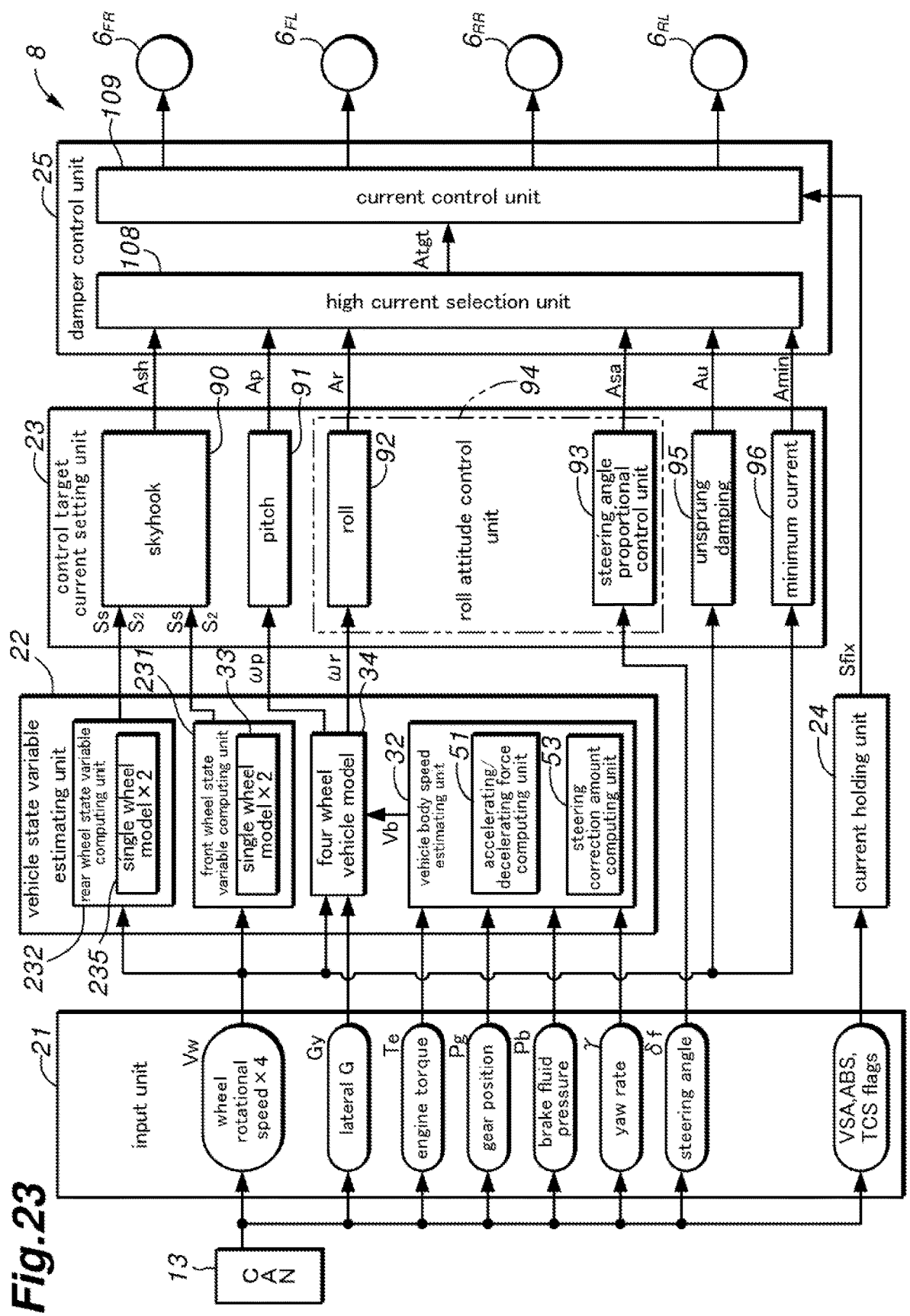
FIG. 23 is a block diagram showing the overall structure of the suspension control system shown in FIG. 21.

As shown in FIG. 23, the ECU 8 includes a front wheel state variable computing unit 231 for the front wheels $3_F$, instead of the state variable computing unit 31, and includes a rear wheel state variable computing unit 232 for the rear wheels $3_R$. The vehicle state variable estimating unit 22 includes four wheel model computing units 34 in addition to the front wheel state variable computing unit 231 and the rear wheel state variable computing unit 232. The front wheel state variable computing unit 231 includes a pair of single wheel model computing units 33 for the two front wheels $3_F$, and the rear wheel state variable computing unit 232 includes a pair of single wheel models 235 for the two rear wheels $3_R$. The single wheel model computing units 33 for the front wheels, and the corresponding single wheel models 38 are no different from those of the first embodiment illustrated in FIGS. 4 and 7, and are therefore not described in any detail here.

Figure 24:
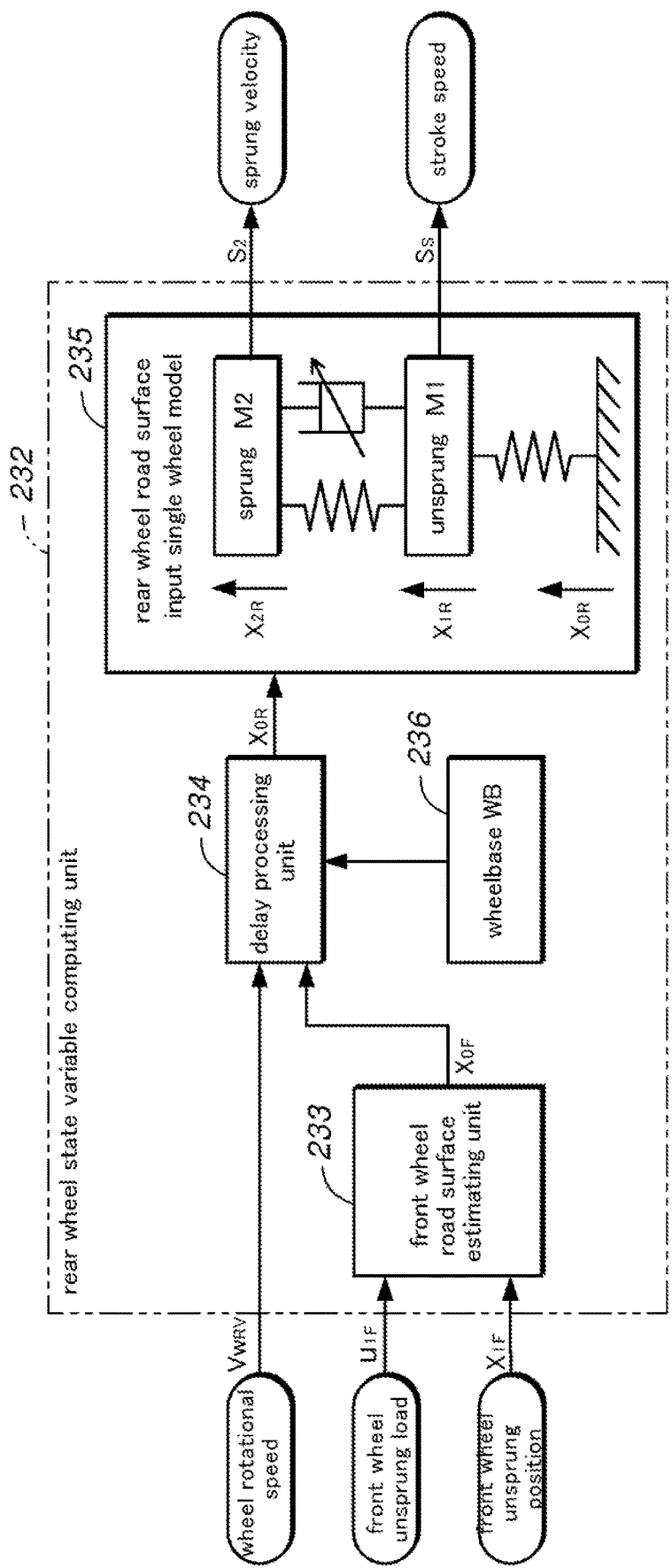
FIG. 24 is a block diagram of the rear wheel state variable computing unit shown in FIG. 23.

As shown in FIG. 24, the rear wheel state variable computing unit 232 computes the sprung velocity $S_2$ and the stroke speed Ss of each rear wheel $3_R$ mainly from the computed result of the front wheel state variable computing unit 231, instead of the wheel rotational speed Vw of the rear wheel $3_R$. In computing the sprung velocity $S_2$ and the stroke speed Ss of each rear wheel $3_R$, the rear wheel state variable computing unit 232 requires the vehicle body speed as will be discussed hereinafter, and the vehicle body speed is based on the average value of the wheel rotational speeds of the four wheels 3, instead of the vehicle body speed Vb computed by the vehicle body speed estimating unit 32. Therefore, the wheel rotational speeds Vw are forwarded to the rear wheel state variable computing unit 232. The details of the rear wheel state variable computing unit 232 are discussed in the following.

As shown in FIG. 24, the rear wheel state variable computing unit 232 includes a front wheel road surface position estimating unit 233, a delay processing unit 234 and a rear wheel road surface input single wheel model 235 for each rear wheel. The front wheel road surface position estimating unit 233 receives the unsprung load $u_{1F}$ and the unsprung position $x_{1F}$ of the corresponding front wheel $3_F$ computed by the rear wheel state variable computing unit 232.

Figure 25:
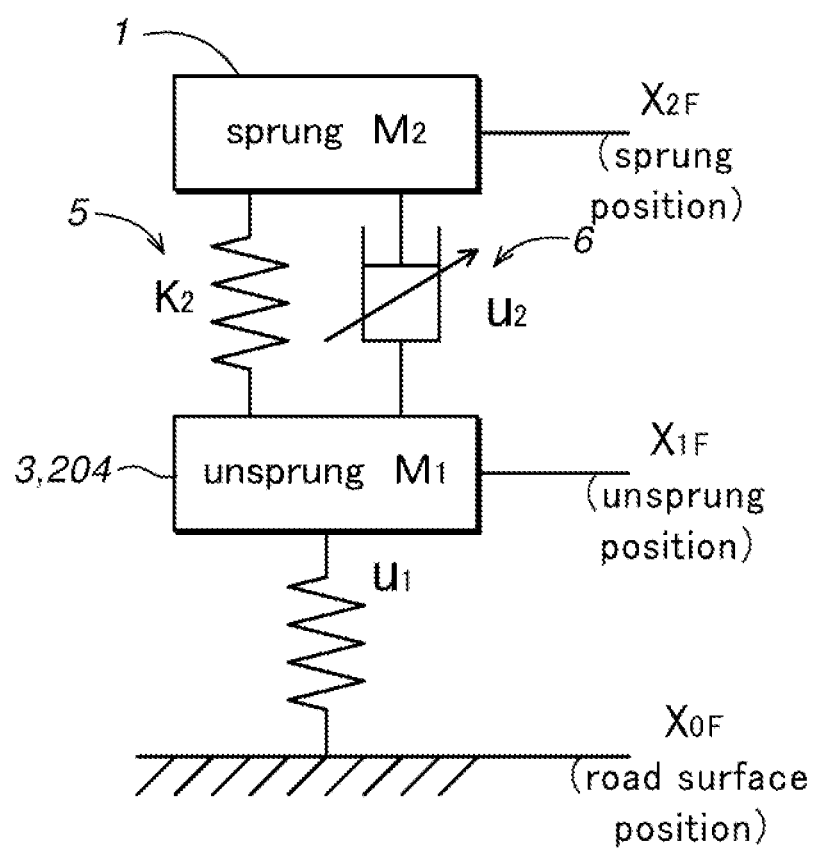
FIG. 25 is a diagram showing the model of the rear wheel suspension shown in FIG. 21.

Based on these values, the front wheel road surface position estimating unit 233 computes the road surface vertical position $x_{0F}$ of the front wheel $3_F$. In other words, the front wheel $3_F$ can be schematically represented as shown in FIG. 25, and the input load $u_{1F}$ of the front wheel $3_F$ can be expressed by Equation (7) given in the following.

$$u_{1F}=Kt(x_{0F}-x_{1F}) \tag{7}$$

where Kt is the modulus of longitudinal elasticity of the tire $2_F$. Following Equation (8) can be obtained from Equation (7).

$$x_{0F} = (u_{1F}/Kt) - x_{1F} \quad (8)$$

Thus, the road surface vertical position $x_{0F}$ of the front wheel $3_F$ can be obtained from the unsprung load $u_{1F}$ and the unsprung position $x_{1F}$ of the corresponding front wheel $3_F$ that are forwarded thereto, and the modulus of longitudinal elasticity of the tire $2_F$ that is stored in memory.

The road surface vertical position $x_{0F}$ of the front wheel $3_F$ provided by the front wheel road surface position estimating unit 233 is forwarded to the delay processing unit 234 which also receives the wheel rotational speeds Vw of the wheels 3 detected by the wheel rotational speed sensors 9. The delay processing unit 234 computes the average value of the wheel rotational speeds Vw to provide the speed of the vehicle body 1, and computes the time required for the road surface vertical position $x_{0F}$ of the front wheel $3_F$ to be transferred to the road surface of the rear wheel 3R as a time delay Td by dividing the wheelbase WB stored in memory 236 by the speed of the vehicle body 1. By delaying the road surface vertical position $x_{0F}$ by this time delay Td (by adding the time delay Td), the delay processing unit 234 converts the road surface vertical position $x_{0F}$ of the front wheel $3_F$ into the road surface vertical position $x_{0R}$ of the rear wheel $3_R$. Thereby, the road surface vertical position $x_{0R}$ of the rear wheel $3_R$ can be computed at a high precision.

The road surface vertical position $x_{0R}$ of the rear wheel $3_R$ is forwarded to the rear wheel road surface input single wheel model 235. Similarly as the single wheel model 38 of the front wheel state variable computing unit 231, using the road surface vertical position $x_{0R}$ as the input, the rear wheel road surface input single wheel model 235 computes and produces the sprung velocity $S_2$ of the rear wheel $3_R$ and the stroke speed Ss of the suspension system $7_R$ from an observer matrix applied to a system matrix modeling a state equation. In other words, the rear wheel road surface input single wheel model 235 serves as a rear wheel state variable computing means for computing a state variable of the vehicle related to the rear wheel $3_R$ from the computation result of the front wheel state variable computing unit 231. In this manner, the state variables of the vehicle related to the rear wheel $3_R$ can be obtained at a high precision according to the road surface vertical position $x_{0F}$ of the front wheel $3_F$.

The sprung velocity $S_2$ of the rear wheel $3_R$ and the stroke speed Ss of the suspension system $7_R$ produced from the rear wheel road surface input single wheel model 235 are forwarded to the skyhook control unit 90 as shown in FIG. 23, and used for the computation of the skyhook target damping force Dsht of the rear wheel $3_R$.

As discussed above, the state variables of the vehicle such as the sprung velocity $S_2$ of the rear wheel $3_R$ and the stroke speed Ss of the suspension system $7_R$ can be computed by making use of the computation result of the front wheel state variable computing unit 231 which is in turn based on the detection result of the wheel rotational speed sensor $9_F$ of the front wheel $3_F$. Therefore, even when each rear wheel is supported on the vehicle body via a trailing arm 204, the state variables of the vehicle related to the rear wheel $3_R$ can be obtained at a high precision.

The speed of the vehicle body 1 is computed by the front wheel road surface position estimating unit 233 as the average value of the wheel rotational speeds Vw of the wheels 3 in the illustrated embodiment, but may also be based on other values, such as the inner wheel side wheel rotational speed and the outer wheel side wheel rotational speed corrected at the subtractor 35 (FIG. 4) by the inner wheel vs vehicle body speed ratio Rvi and outer wheel vs vehicle body speed ratio Rvo produced by the vehicle body speed estimating unit 32 (FIG. 23). When the wheel rotational speeds Vw of the rear wheels $3_R$ are not used by the unsprung damping control means or the ABS, the wheel rotational speed sensor $9_R$ provided on each rear wheel $3_R$ may be omitted.

The present invention was described in terms of specific embodiments, but the present invention is not limited by the illustrated embodiments, and can be changed in various parts thereof. For instance, the positions and arrangements of the various members and components, and the specific modes of control can be freely modified without departing from the spirit of the present invention. The various components included in the foregoing embodiments are not entirely essential to the invention, but may be selectively omitted without departing from the spirit of the present invention.

LIST OF NUMERALS

V vehicle
3 wheel
6 damper (variable damper)
8 ECU
9 wheel rotational speed sensor
20 suspension control system
23 control target current setting unit (damper control means)
25 damper control unit (damper control means)
31 state variable computing unit (state variable computing means)
32 vehicle body speed estimating unit (vehicle body speed estimating means)
33 single wheel model computing unit
35 subtractor (wheel rotational speed sensor correcting means)
36 band pass filter (first filter, wheel rotational speed variation extracting means)
37 gain circuit (base input value computing unit)
38 single wheel model (vehicle model)
45 third observer matrix (sprung velocity computing means)
46 fourth observer matrix (stroke speed computing means)
51 accelerating/decelerating force computing unit (drive/brake force computing means)
52 vehicle body speed computing unit (vehicle body speed computing means)
53 steering correction amount computing unit (cornering state variable computing means)
90 skyhook control unit (sprung control unit)
95 unsprung damping control unit
101 band pass filter (second filter)
231 front wheel state variable computing unit (front wheel state variable computing means)
232 rear wheel state variable computing unit (rear wheel state variable computing means)
F acceleration/deceleration (drive/brake force)
Fe drive force (acceleration)
Fb brake force
Fs deceleration owing to downward inclination
Fr traveling resistance
Gx fore and aft acceleration (vehicle body acceleration)
Rvi inner wheel vs vehicle body speed ratio (cornering state variable)
Rvo outer wheel vs vehicle body speed ratio (cornering state variable)

Vw wheel rotational speed (input signal)
ΔVw wheel rotational speed variation
Vb vehicle body speed
Vbi inner wheel side vehicle body speed
Vbo outer wheel side vehicle body speed
Vwav average wheel rotational speed
$u_1$ unsprung load (base input value))
S2 sprung velocity (state variable)
Ss stroke speed (state variable)
$x_0$ road surface vertical position

The invention claimed is:

1. A suspension control system for a vehicle provided with a variable damper that can adjust a damping force according to an input signal, comprising:
 a wheel rotational speed sensor for detecting a wheel rotational speed;
 an un-sprung load computing means for computing an un-sprung load of the vehicle according to a wheel rotational speed variation detected by the wheel rotational speed sensor, the un-sprung load consisting of a road contact load variation of the vehicle;
 a state variable computing means for computing state variables of the vehicle by feeding the un-sprung load to a vehicle model representing a behavior of a sprung mass and an un-sprung mass of the vehicle in relation to the un-sprung load, the state variables including a sprung velocity and a suspension stroke speed of the vehicle; and
 a damper control means for controlling the damping force of the variable damper according to the computed state variables,
 wherein the un-sprung load computing means converts the wheel rotational speed variation into the un-sprung load based on a relationship between the wheel rotational speed variation and the un-sprung load, the relationship being predetermined based on actually detected values of the wheel rotational speed and a road contact load.

2. The suspension control system according to claim 1, further comprising a first filter for the wheel rotational speed sensor for a first frequency range corresponding to a vibration of the sprung mass, and a second filter for the wheel rotational speed sensor for a second frequency range higher than the first frequency range,
 wherein the damper control means includes a sprung damping control means for controlling the damping force of the variable damper according to the wheel rotational speed variation filtered by the first filter, and an unsprung damping control means for controlling the damping force of the variable damper according to the wheel rotational speed variation filtered by the second filter.

3. The suspension control system according to claim 1, further comprising a vehicle body speed estimating means for estimating a vehicle body speed according to a vehicle body acceleration of the vehicle, and a wheel rotational speed correcting means for computing a corrected wheel rotational speed by subtracting an estimated wheel rotational speed estimated from the vehicle body speed from a detected value of the wheel rotational speed sensor,
 wherein the un-sprung load computing means is configured to compute the un-sprung load of the vehicle according to a wheel rotational speed variation of the corrected wheel rotational speed.

4. The suspension control system according to claim 3, wherein the vehicle body speed estimating means estimates the vehicle body acceleration of the vehicle according to a drive/brake force of the vehicle and an inclination of a road surface.

5. The suspension control system according to claim 4, wherein the vehicle body speed estimating means estimates a traveling resistance of the vehicle according to the detected wheel rotational speed, and estimates the vehicle body acceleration of the vehicle by taking into account the estimated traveling resistance.

6. The suspension control system according to claim 3, further comprising a filter for a frequency range corresponding to a vibration of the sprung mass, the filter filtering the corrected wheel rotational speed so as to remove variation due to the vehicle body acceleration to thereby extract a corrected wheel rotational speed in the frequency range corresponding to the vibration of the sprung mass, wherein the un-sprung load computing means is configured to compute the un-sprung load of the vehicle according to a wheel rotational speed variation of the corrected wheel rotational speed extracted by the filter.

7. The suspension control system according to claim 1, further comprising a cornering state variable computing means for computing a cornering state variable and a wheel rotational speed correcting means for correcting a detected value of the wheel rotational speed sensor according to the computed cornering state variable,
 wherein the un-sprung load computing means computes the un-sprung load of the vehicle according to a wheel rotational speed variation of the corrected wheel rotational speed.

8. The suspension control system according to claim 1, further comprising
 a wheel rotational speed variation extracting means for extracting a wheel rotational speed variation of a frequency range corresponding to a sprung vibration of the vehicle according to the detected wheel rotational speed, such that the un-sprung load computing means computes the un-sprung load according to the wheel rotational speed variation extracted by the wheel rotational speed variation extracting means.

9. The suspension control system according to claim 1, wherein
 the wheel rotational speed sensor is provided on a front wheel, and the un-sprung load computing means computes the un-sprung load with respect to the front wheel,
 the state variable computing means including a front wheel state variable computing means for computing the state variables of the vehicle associated with the front wheel, and a rear wheel state variable computing means for computing the state variables of the vehicle associated with a rear wheel according to the state variables computed by the front wheel state variable computing means.

10. The suspension control system according to claim 9, wherein the un-sprung load computing means computes the un-sprung load associated with the front wheel, and the state variables computed by the front wheel state variable computing means include an unsprung position associated with the front wheel,
 the rear wheel state variable computing means being configured to compute a road surface vertical position associated with the front wheel according to the unsprung load associated with the front wheel and the un-sprung position associated with the front wheel, and compute the state variables of the vehicle associated with ft the rear wheel according to the computed road surface vertical position associated with the front wheel.

11. The suspension control system according to claim 10, wherein the rear wheel state variable computing means is configured to compute a road surface vertical position associated with the rear wheel by applying a time delay corresponding to a vehicle speed to the road surface vertical position associated with the front wheel, and compute the state variables of the vehicle associated with the rear wheel according to the road surface vertical position of the vehicle associated with the rear wheel.

* * * * *